(12) United States Patent
Abe

(10) Patent No.: US 7,614,744 B2
(45) Date of Patent: Nov. 10, 2009

(54) OPTICAL IMAGE MEASURING APPARATUS

(75) Inventor: Tomoyoshi Abe, Tokyo (JP)

(73) Assignee: Kabushiki Kaisha Topcon, Itabashi-Ku (JP)

( * ) Notice: Subject to any disclaimer, the term of this patent is extended or adjusted under 35 U.S.C. 154(b) by 305 days.

(21) Appl. No.: 11/378,259

(22) Filed: Mar. 20, 2006

(65) Prior Publication Data

US 2006/0215172 A1    Sep. 28, 2006

(30) Foreign Application Priority Data

Mar. 24, 2005    (JP) .............................. 2005-085222

(51) Int. Cl.
*A61B 3/14*    (2006.01)
(52) U.S. Cl. .................... 351/209; 351/200; 351/205
(58) Field of Classification Search ................. 351/205, 351/206, 208, 210, 221; 356/489, 495, 497, 356/479, 450, 456, 484
See application file for complete search history.

(56) References Cited

U.S. PATENT DOCUMENTS 6,485,413 B1    11/2002  Boppart et al. .............. 600/160

FOREIGN PATENT DOCUMENTS

| JP | 2001-330558 | | 11/2001 |
|---|---|---|---|
| JP | 2001330558 A | * | 11/2001 |
| JP | 2004-191114 | | 7/2004 |
| JP | 2004-354317 | | 12/2004 |
| JP | 2004354317 A | * | 12/2004 |

OTHER PUBLICATIONS

N. Tanno; "Optical coherence tomography and its application to living-body imaging;" *Japanese Journal of Optics*; vol. 28; No. 3; 1999; pp. 116-125, cover sheet and translation (14 Sheets total.)/ Discussed in the specification.

Yoshizawa, et al; "Optical Heterodyne Technology (revised edition);" *New Technology Communications*; 2003; pp. 1-11, cover sheet and translation (9 Sheets total.)/Discussed in the specification.

(Continued)

*Primary Examiner*—Scott J Sugarman
*Assistant Examiner*—James R Greece
(74) *Attorney, Agent, or Firm*—Edwards Angell Palmer & Dodge LLP

(57) ABSTRACT

An optical image measuring apparatus capable of speedily starting image measurement in response to a measurement start request and performing image measurement on a region on which focus is achieved at determination of an image region. When observation light (M) is focused on an observation CCD camera (23), measurement CCD cameras (21, 22) are disposed to have a measurement object point (Q) in a position shifted from point (P) to an apparatus side. In response to a measurement start switch (60), an interferometer moving stage (50) is moved to adjust an optical path length difference, thereby shifting the point (Q) to the point (P). The distance (d) is set to equal to or longer than necessary to move the interferometer moving stage (50) which accelerates a moving speed thereof to a predetermined speed. Thereby, image measurement can speedily start in response to request for image measurement of an object (O). It is possible to perform image measurement on the region where focus is achieved at the time of determination of the measurement region, i.e., at the position of the point (P).

13 Claims, 13 Drawing Sheets

OTHER PUBLICATIONS

K.P. Chan et al.; "Micrometre-resolution, optical imaging of objects through highly scattering media using a heterodyne detector array;" *Electronics Letters*; vol. 30; No. 21; Oct. 13, 1994; pp. 1753-1754./Discussed in the specification.

M. Akiba, et al.; "Real-Time, Micrometer Depth-Resolved Imaging by Low-Coherence Reflectometry and a Two-Dimensional Heterodyne Detection Technique;" *Jpn. J. Appl. Phys.*; vol. 39; 2000; pp. L1194-L1196./Discussed in the specification.

* cited by examiner

OPTICAL IMAGE MEASURING APPARATUS

BACKGROUND OF THE INVENTION

1. Field of the Invention

The present invention relates to an optical image measuring apparatus employing a structure in which an object to be measured is irradiated with a light beam and a surface form or inner form of the object to be measured is measured based on a reflected light beam or a transmitted light beam to produce an image of a measured form.

2. Description of the Related Art

In recent years, attention has been given to an optical image measuring technique for producing an image of a surface or inner portion of an object to be measured using a laser light source or the like. This optical image measuring technique is not hazardous to human bodies in contrast to optical image measuring techniques using radial rays such as X-ray CT. Therefore, development of applications in particular the medical field has been expected.

An example of a typical method in the optical image measuring technique is a low coherent interference method (also called an optical coherent tomography or the like). This method uses low coherence of a broadband light source having a wide spectral width, such as a super luminescent diode (SLD). According to the method, reflection light from an object to be measured or light transmitting therethrough can be detected at superior distance resolution of μm order (for example, see Naohiro Tanno, "Kogaku", Volume 28, No. 3, 116 (1999)).

FIG. 13 shows a fundamental structure of a conventional optical image measuring apparatus based on a Michelson interferometer, serving as an example of an apparatus using the low coherent interference method. An optical image measuring apparatus 200 includes a broadband light source 201, a mirror 202, a beam splitter 203, and a photo detector 204. An object to be measured 205 is any object such as corneal or retina of a human eye made of a scattering medium. A light beam from the broadband light source 201 is divided by the beam splitter 203 into two, that is, reference light R propagating to the mirror 202 and signal light S propagating to the object to be measured 205. The reference light R is light reflected by the beam splitter 203. The signal light S is light transmitting through the beam splitter 203.

Here, as shown in FIG. 13, a propagating direction of the signal light S is set as a z-axis and a plane orthogonal to the propagating direction of the signal light S is defined as an x-y plane. The mirror 202 is shiftable in a direction indicated by a double-headed arrow in FIG. 13 (z-scanning direction).

The reference light R is subjected to Doppler frequency shift by z-scanning when it reflects to the mirror 202. On the other hand, the signal light S is reflected on a surface of the object to be measured 205 and inner layers thereof when the object to be measured 205 is irradiated with the light. Because the object to be measured 205 is the scattering medium, reflection light of the signal light S may be a diffusing wave having random phases including multiple scattering. The signal light propagating through the object to be measured 205 and the reference light that propagates through the mirror 202 and is subjected to the frequency shift are superimposed on each other by the beam splitter 203 to produce interference light.

In the image measurement using the low coherent interference method, a difference in optical path length between the signal light S and the reference light R is within a coherent length (coherent distance) of μm order of the light source. In addition, only a component of the signal light S which has phase correlation to the reference light R interacts with the reference light R to produce interference light. That is, only a coherent signal light component of the signal light S selectively interacts with the reference light R. Based on such fundamentals, the position of the mirror 202 is shifted to change the optical path length of the reference light R, so that the interference light including information of reflection light obtained at various z-coordinates (measuring depth) of the object to be measured 205 is produced. As a result, a light reflection profile of the inner layers of the object to be measured 205 is measured. The object to be measured 205 is also scanned with the irradiated signal light S in an x-y plane direction. The interference light is detected by the photo detector 204 during scanning in such a z-direction and x-y plane direction. An electrical signal (heterodyne signal) outputted as a result obtained by the detection is analyzed to obtain a two-dimensional sectional image of the object to be measured 205 (for example, see Naohiro Tanno, "Kogaku", Volume 28, No.3, 116 (1999)).

It is assumed that an intensity of the reference light R and an intensity of the signal light S which are superimposed by the beam splitter 203 are given by $I_r$ and $I_s$, respectively, and a frequency difference between the reference light R and the signal light S and a phase difference therebetween are given by $f_{if}$ and $\Delta\theta$, respectively. In this case, a heterodyne signal as expressed by the following expression is outputted from the photo detector (for example, see Yoshizawa and Seta "Optical Heterodyne Technology (revised edition)", New Technology Communications (2003), p.2).

$$i(t) \propto I_r + I_s + 2\sqrt{I_r I_s} \cos(2\pi f_{if} t + \Delta\theta) \tag{1}$$

The third term of the right side of the expression (1) indicates an alternating current electrical signal and the frequency $f_{if}$ thereof is equal to a frequency of beat caused from the reference light R and the signal light S. The frequency $f_{if}$ of an alternating current component of the heterodyne signal is called a beat frequency or the like. The first and second terms of the right side of the expression (1) indicate direct current components of the heterodyne signal and correspond to a signal intensity of background light of interference light.

When the two-dimensional sectional image is intended to be obtained by means of the conventional low coherent interference method, it is necessary to scan the object to be measured 205 with a light beam and to successively detect reflection light waves from respective regions of the object to be measured 205 in a measuring depth direction (z-direction) and a sectional direction (x-y plane direction). Therefore, in this method, the measurement of the object to be measured 205 requires a long time. In addition, it is hard to shorten a measurement time in view of measurement fundamentals.

In views of such problems, an optical image measuring apparatus for shortening a measurement time has been proposed. FIG. 14 shows a fundamental structure of an example of such an apparatus. As shown in FIG. 14, an optical image measuring apparatus 300 includes a broadband light source 301, a mirror 302, a beam splitter 303, a two-dimensional photo sensor array 304 serving as a photo detector, and lenses 306 and 307. A light beam from the light source 301 is converted into a parallel light flux by the lenses 306 and 307 and a beam diameter thereof is increased thereby. Then, the parallel light flux is divided by the beam splitter 303 into two, that is, the reference light R and the signal light S. The reference light R is subjected to Doppler frequency shift by z-scanning of the mirror 302. On the other hand, the signal light S is incident on an object to be measured 305 over a wide area of the x-y plane because the beam diameter has been increased. Therefore, the signal light S becomes reflection light including information related to the surface and inner portion of the object to be measured 305 in the incident area. The reference light R and the signal light S are superimposed on each other by the beam splitter 303 and detected by elements (photo sensors) arranged in parallel on the two-dimensional photo sensor array 304. As described above, according to the optical image measuring apparatus 300, it is possible to obtain a two-dimensional sectional image of the object to be measured 305 in real time without light beam scanning in the x-y plane direction.

An apparatus described in K. P. Chan, M. Yamada, and H. Inaba, "Electronics Letters", Vol. 3, 1753 (1994) has been known as such a non-scanning type optical image measuring apparatus. In the apparatus described in the same document, a plurality of heterodyne signals outputted from a two-dimensional photo sensor array are inputted to signal processing systems arranged in parallel to detect the amplitude and phase of each of the heterodyne signals.

However, when spatial resolution of an image is intended to be improved in such the non-scanning type optical image measuring apparatus, it is necessary to increase the number of elements of the array. In addition, it is necessary to prepare a signal processing system including the number of channels corresponding to the number of elements. Therefore, it is likely to be hard to actually use the apparatus in fields that require a high-resolution image, such as a medical field and an industrial field.

In view of such a problem, the following optical image measuring apparatus is proposed (see JP 2001-330558 A). The optical image measuring apparatus described in JP 2001-330558 A includes a light source for generating a light beam, an interference optical system, and a signal processing portion. In the interference optical system, the light beam emitted from the light source is divided into two, that is, signal light propagating through an examined object locating position in which an object to be examined is located and reference light propagating on an optical path different from an optical path passing through the examined object locating position. The signal light propagating through the examined object locating position and the reference light propagating on the different optical path are superimposed on each other to produce interference light. The interference optical system includes a frequency shifter, light cutoff devices, and photo sensors. The frequency shifter shifts a frequency of the signal light and a frequency of the reference light relative to each other. In order to receive the interference light in the interference optical system, the interference light is divided into two parts. The light cutoff devices periodically cut off the two divided parts of the interference light to generate two interference light pulse trains with a phase difference of 90 degrees therebetween. The photo sensors respectively receive the two interference light pulse trains. The photo sensors each have a plurality of light receiving elements which are spatially arranged and each of which separately obtains a light receiving signal. The signal processing portion combines a plurality of light receiving signals obtained by each of the photo sensors to generate signals of the signal light which correspond to respective points of interest of a surface or inner layers of the object to be examined which is located in the examined object locating position on a propagating path of the signal light.

That is, in the optical image measuring apparatus described in JP 2001-330558 A, an optical path of the interference light produced by superimposing the reference light and the signal light on each other is divided into two optical paths and the light cutoff device and the photo sensor (two-dimensional photo sensor array) are disposed on each of the two optical paths. A phase difference of $\pi/2$ is set between sampling periods of the light cutoff devices disposed on the two optical paths. Thereby, an intensity of background light of the interference light and phase quadrature components (sine component and cosine component) of the interference light are detected. In addition, the intensity of the background light is subtracted from receiving signals outputted from the photo sensors to calculate two phase quadrature components of the interference light. An amplitude of the interference light is acquired based on a result obtained by the calculation.

For example, when the optical image measuring apparatus is used to measure a medical image such as a corneal epithelial image or a retina image (eye fundus image), first, it is necessary that visible light (observation light) be emitted to an affected area and its vicinities which are to be observed to determine a region for image measurement (measurement region). Many measurement regions are expanded in a depth direction (z-direction). Upon receipt of a measurement start trigger inputted by an examiner, the optical image measuring apparatus emits measurement light from the broad band light source to the measurement region and performs the measurement while a measurement position is shifted in the z-direction to scan the measurement region. Thereby, an image of a desirable measurement region is obtained.

The measurement position is shifted in the z-direction to scan the measurement region by adjusting an optical path length of the signal light and an optical path length of the reference light relative to each other. In the above-mentioned conventional structure, the optical path length of the reference light is adjusted by moving the reflecting mirror for reflecting the reference light. On the other hand, in order to adjust the optical path length of the signal light, the structure is known in which a condenser lens for condensing a light beam from a light source, a half mirror for dividing the light beam into signal light and reference light, and a reflecting mirror for reflecting the reference light are integrally moved in an optical path direction of the signal light (see, for example, JP 2004-191114 A). When the optical path length changes, the reference light or the signal light is subjected to Doppler frequency shift. At this time, if an adjustment speed of the optical path length is not constant, the amount of frequency shift does not become constant. Therefore, in some cases, a result obtained by measurement includes false information or the measurement cannot be performed.

When the conventional optical image measuring apparatus is to be applied to the above-mentioned medical image measurement, a method of performing both observation and image measurement on an affected area and its vicinities using the same camera (such as a CCD camera) and a method of performing the observation and the image measurement using different cameras are expected.

In the case where the method using the same camera is selected, when an observation stage is shifted to a measurement stage, a time lag occurs between the input of the measurement start trigger and the acquisition of the measurable state, with the result that the measurement area cannot be preferably measured. To explain it more specifically, in the observation stage, the entire optical image measuring apparatus is moved backward and forward to adjust the focus of the camera and the affected area and the like are observed with such a focused state. When the measurement starts in this state and the optical path length starts to adjust, preferable image measurement cannot be performed until the measurable state is obtained, that is, until the adjustment speed of the optical path length becomes constant. In particular, at the time of the start of measurement, that is, at the time of determination of the measurement region, a focused region (measurement region) cannot be subjected to image measurement, so a great disadvantage that an image of a desirable region is missed occurs.

On the other hand, even in the case where the method using an observation camera and a measurement camera which are separately provided is selected, when the observation stage is shifted to the measurement stage in the conventional optical image measuring apparatus, the focus of the measurement camera cannot be speedily adjusted to that of the observation camera. Therefore, as in the case where the same camera is used, a time lag occurs between the input of the measurement start trigger and the acquisition of the measurable state. Thus, a desirable region on which focus, is achieved at the time of determination of the measurement region cannot be subjected to image measurement.

SUMMARY OF THE INVENTION

The present invention has been made in view of the above-mentioned circumstances. An object of the present invention is to provide an optical image measuring apparatus capable of speedily starting image measurement in response to an image measurement start request for an object to be measured and performing the image measurement for a region on which focus is achieved at the time of determination of a measurement region.

According to a first aspect of the present invention, when the reflection light of the observation light is focused on the observation light receiving means, the measurement light receiving means is located to have the measurement object point in the position shifted from the position of the observation object point in the optical path direction of the signal light by a predetermined distance. When the operating means is operated, the optical path length adjusting means adjusts the optical path length difference so as to shift the measurement object point of the measurement light receiving means to the position of the observation object point. Therefore, the image measurement can speedily start in response to a start request for image measurement of the object to be measured. In addition, it enables to perform image measurement on a region on which focus is achieved at the time of determination of the measurement region, that is, at the position of the observation object point.

According to a second aspect of the present invention, when the reflection light of the observation light is focused on the observation light receiving means, the measurement light receiving means is disposed to locate the measurement object point in the position equal to the observation object point. When the operating means is operated, the optical path length adjusting means adjusts the optical path length difference so as to shift the measurement object point of the measurement light receiving means in the optical path direction of the signal light by a predetermined distance and then adjusts the optical path length difference so as to shift the measurement object point to the position of the observation object point. Therefore, the image measurement can speedily start in response to the start request for image measurement of the object to be measured. In addition, it enables to perform the image measurement at the position of the observation object point on which focus is achieved at the time of determination of the measurement region.

According to a third aspect of the present invention, when the reflection light of the observation light is focused on the observation light receiving means, the measurement light receiving means is disposed to locate the measurement object point in the position equal to the observation object point. The optical image measuring apparatus further includes an optical member which is inserted to the optical path of the signal light when the operating means is operated and acts to adjust an optical path length of the signal light to displace the measurement object point in the optical path direction of the signal light by the predetermined distance. In addition, when the operating means is operated, the optical path length adjusting means adjusts the optical path length difference so as to shift the measurement object point displaced by the predetermined distance to the position of the measurement object point set before the optical path length is adjusted by the optical member. Therefore, the image measurement can speedily start in response to the start request for image measurement of the object to be measured. In addition, it enables to perform the image measurement at the position of the observation object point on which focus is achieved at the time of determination of the measurement region.

BRIEF DESCRIPTION OF THE DRAWINGS

In the accompanying drawings:

FIGS. 3A to 3D are explanatory graphs showing interference light detection modes of the optical image measuring apparatus according to the present invention, in which FIG. 3A is a graph showing a time waveform of measurement light whose intensity is modulated and which is outputted from a broadband light source, FIG. 3B is a graph showing a time waveform of an S-polarized light component of interference light in the case where the measurement light outputted from the broadband light source is continuous light, FIG. 3C is a graph showing a time waveform of a P-polarized light component of the interference light in the case where the measurement light outputted from the broadband light source is the continuous light, FIG. 3D is a graph showing a time waveform of the S-polarized light component of the interference light in the case where the intensity of the measurement light outputted from the broadband light source is modulated, and FIG. 3E is a graph showing a time waveform of the P-polarized light component of the interference light in the case where the intensity of the measurement light outputted from the broadband light source is modulated;

DETAILED DESCRIPTION OF THE PREFERRED EMBODIMENTS

Hereinafter, examples of an optical image measuring apparatus according to each of preferred embodiments of the present invention will be described in detail with reference to the accompanying drawings.

The optical image measuring apparatus according to the present invention is expected particularly in the medical field and preferably used to measure a living tissue composed of a scattering medium, such as a corneal epithelium of a human eye or a retina thereof.

First Embodiment

A first embodiment of the present invention will be described.

[Structure of Apparatus]

Figure 1:
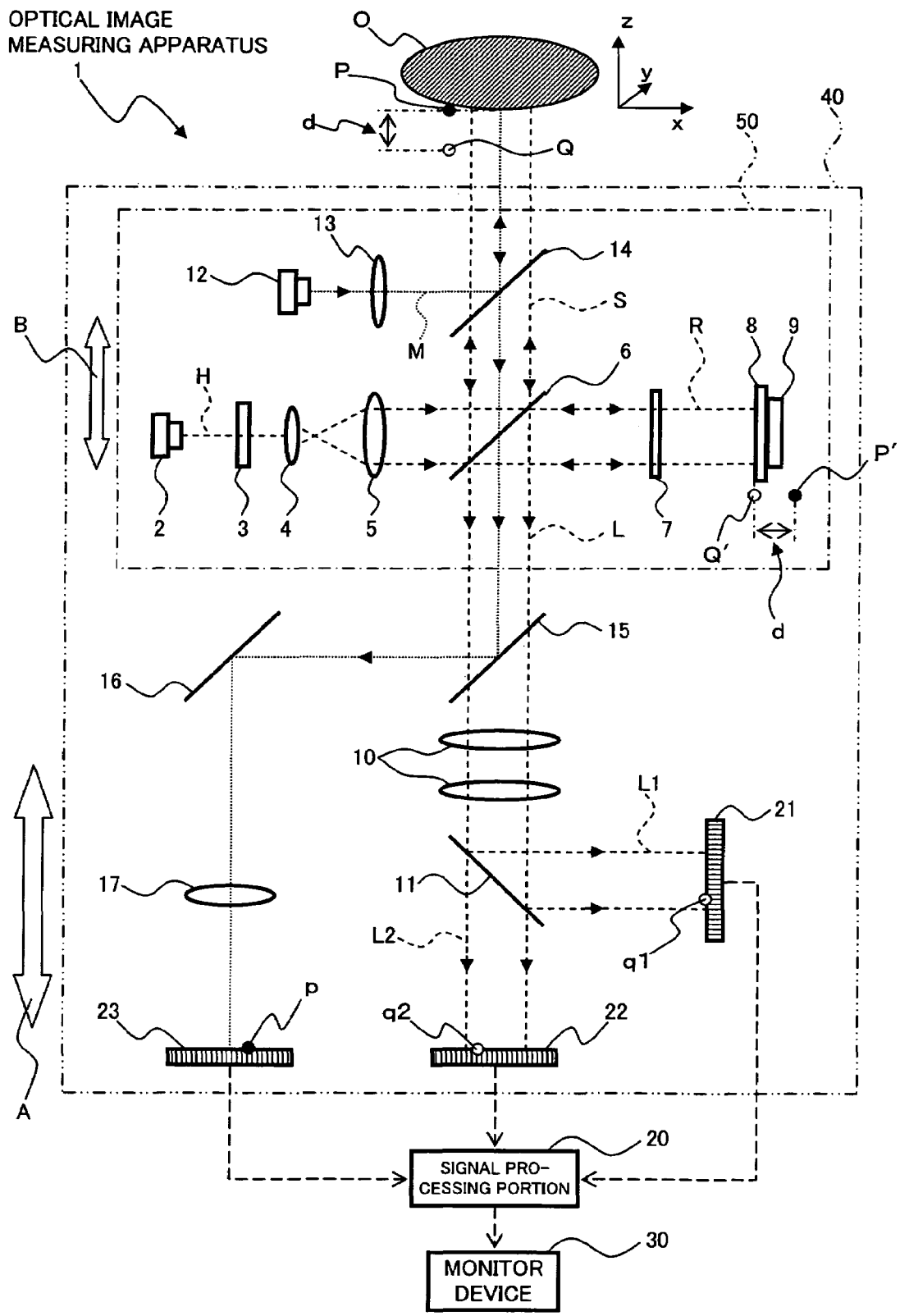
FIG. 1 is a schematic diagram showing an example of a configuration of an optical system of an optical image measuring apparatus according to a first embodiment of the present invention.
Figure 2:
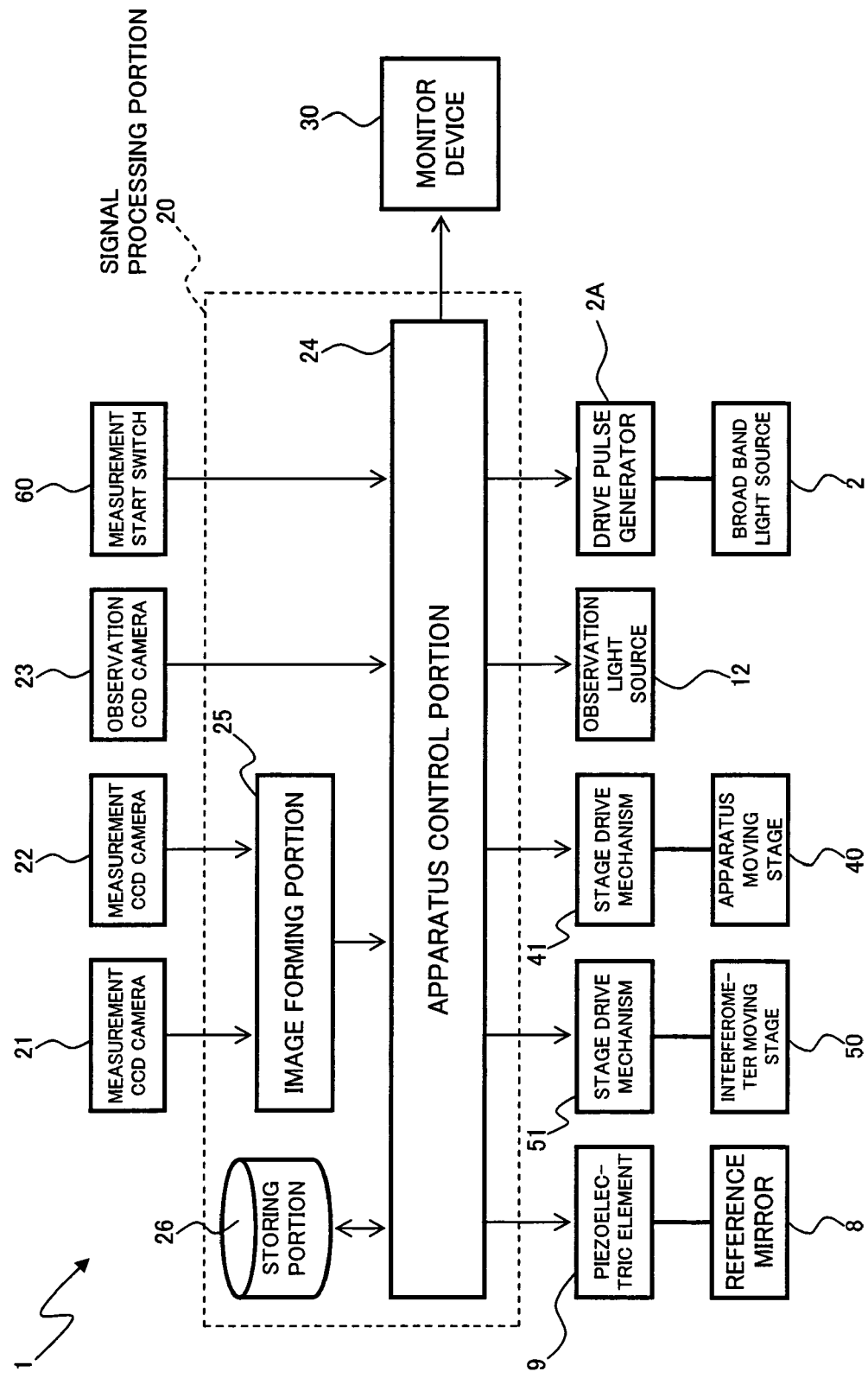
FIG. 2 is a block diagram showing an example of a configuration of a control system of the optical image measuring apparatus according to the first embodiment of the present invention.

An optical image measuring apparatus according to the first embodiment of the present invention will be described with reference to FIGS. 1 and 2. FIG. 1 illustrates a schematic structure of an optical system of an optical image measuring apparatus 1 according to this embodiment and FIG. 2 illustrates a structure of a control system thereof.

The optical image measuring apparatus 1 includes an optical system for performing image measurement on an object to be measured (measurement optical system) and an optical system for observing the object to be measured before the image measurement (observation optical system).

[Measurement Optical System]

The optical image measuring apparatus 1 according to this embodiment includes a broad band light source 2 for outputting a low-coherent measurement light beam H, a polarizing plate 3 for converting a polarization characteristic of the measurement light H to linear polarization, lenses 4 and 5 for converting the measurement light H having the linear polarization characteristic to a parallel light flux and increasing a beam diameter thereof, and a half mirror 6 for dividing the measurement light H having the increased beam diameter into signal light S and reference light R and superimposing the signal light S and the reference light R on each other to produce superimposed light L. The optical image measuring apparatus 1 further includes a wavelength plate 7 for converting a polarization characteristic of the reference light R from linear polarization to circular polarization, a reference mirror 8 for totally reflecting the reference light R on a reflective surface orthogonal to a propagating direction of the reference light R, and a piezoelectric element 9 provided on a rear surface opposite to the reflective surface of the reference mirror 8.

The broad band light source 2 is composed of an SLD, a light-emitting diode (LED), or the like. A coherent length of a commercially available near-infrared region SLD is approximately 30 μm and a coherent length of an LED is approximately 10 μm. The broad band light source 2 is driven based on a pulse signal having a predetermined frequency, which is outputted from a drive pulse generator 2A shown in FIG. 2 to periodically output the pulse measurement light H (this will be described in detail later). The measurement light H is outputted as, for example, pulse light of a rectangular train with a duty of 50%. The broad band light source 2 corresponds to an example of a "measurement light source" in the present invention.

In an xyz-coordinate system shown in FIG. 1, a propagating direction of the signal light S which is outputted from the broad band light source 2 and propagates to an object to be measured O is defined as a z-axis direction and an oscillation plane of the signal light S orthogonal to the propagating direction thereof is defined as an x-y plane. An x-axis direction and a y-axis direction are defined so as to align with an oscillation plate of an electric field component of the measurement light H and an oscillation plate of a magnetic field component thereof, respectively. In addition, a z-axis direction corresponds to an image measurement depth direction (depth direction) of the object to be measured O.

The polarizing plate 3 is a polarization conversion element for transmitting an oscillation component of the measurement light H in a predetermined direction, which is outputted from the broad band light source 2. The polarizing plate 3 is constructed to transmit an oscillation component in an angle direction of 45° relative to each of an x-axis and a y-axis of the xyz-coordinate system. Therefore, the measurement light H passing through the polarizing plate 3 includes linearly polarized light of 45°. Thus, the amplitudes of polarization components of the measurement light H in the x-axis direction and the y-axis direction are equal to each other. In other words, the amplitude of a P-polarized light component of the measurement light H is equal to that of an S-polarized light component thereof.

The half mirror 6 corresponds to an example of "dividing means" in present invention and acts to divide the measurement light H of linear polarization which is converted to the parallel light flux into the signal light S propagating to the object to be measured O and the reference light R propagating to the reference mirror 8. The half mirror 6 transmits a part (half) of the measurement light H to form the reference light R and reflects the rest thereof to form the signal light S.

The half mirror 6 further corresponds to an example of "superimposing means" in the present invention and acts to transmit a part of the signal light S propagating through the object to be measured O and to reflect a part of the reference light R propagating through the reference mirror 8 to superimpose the signal light S and the reference light R on each other, thereby producing interference light L. The interference light L is pulse light having a frequency equal to that of the measurement light H outputted from the broad band light source 2.

In this embodiment, because a Michelson interferometer which is composed of the object to be measured 0 and the reference mirror 8 which serve as reflectors and the half mirror 6 is used, each of the dividing means and the superimposing means is composed of (different reflective surface of) the same half mirror 6. On the other hand, when another interferometer such as a Mach-Zehnder interferometer is employed, an optical element composing the dividing means may be different from an optical element composing the superimposing means. An arbitrary non-polarization beam splitter having no influence on the polarization characteristics of, the measurement light beam H, the signal light S, and reference light R is desirably employed for each of the dividing means and the superimposing means.

The wavelength plate 7 is a polarization conversion element for converting the polarization characteristic of the reference light R which is converted to the linear polarization by the polarizing plate 3 to circular polarization. In this embodiment, a ⅛-wavelength plate is used as the wavelength plate 7. Therefore, when the reference light R passes through the wavelength plate 7, a phase difference between a P-polarized light component of the reference light R and an S-polarized light component thereof becomes $\pi/4$. In each of the case where the reference light R propagates from the half mirror 6 to the reference mirror 8 through the wavelength plate 7 and the case where the reference light R is reflected on the reference mirror 8 and returns to the half mirror 6 through the waveguide plate 7, the above-mentioned phase difference is applied to the reference light R. As a result, a phase difference of $\pi/2$ is applied to the reference light R. Thus, the wavelength plate 7 acts on the reference light R having linearly polarized light of 45° in the same manner as the ¼-wavelength plate, so the reference light R which is incident on the half mirror 6 again is converted to circularly polarized light. When another interferometer such as the Mach-Zehnder interferometer is used as described above, the reference light R is converted to the circularly polarized light using the ¼-wavelength plate or the like as appropriate.

The reference mirror 8 corresponds to an example of a "reference object" in the present invention. The reference mirror 8 is vibrated in an optical path direction of the reference light R by the piezoelectric element 9 to shift the frequency of the reference light R. Therefore, the reference mirror 8 and the piezoelectric element 9 correspond to "frequency shifting means" in the present invention.

The optical image measuring apparatus 1 further includes an imaging lens group 10 for imaging the interference light L produced by the half mirror 6, a polarization beam splitter 11 for dividing an optical path of the interference light L into two optical paths, and measurement CCD cameras 21 and 22 provided on the two optical paths into which the optical path of the interference light L is divided.

The polarization beam splitter 11 acts to separate the interference light L into a plurality of polarization components. More specifically, the polarization beam splitter 11 acts to reflect an S-polarized light component L1 of the interference light L to guide the reflected S-polarized light component L1 to the measurement CCD camera 21 and acts to transmit a P-polarized light component L2 thereof to guide the transmitted P-polarized light component L2 to the measurement CCD camera 22. As described above, the amplitude of S-polarized light component L1 of the interference light L is equal to that of the P-polarized light component L2 thereof by the alignment (45°) of a polarization axis of the polarizing plate 3.

The measurement. CCD cameras 21 and 22 correspond to an example of "measurement light receiving means" in the present invention and each are a storage type two-dimensional photo sensor array for interference light detection. The measurement CCD camera 21 receives the S-polarized light component L1 of the interference light L which is reflected on the polarization beam splitter 11, performs photoelectric conversion on the received S-polarized light component L1 to generate a detection signal, and outputs the detection signal to a signal processing portion 20. Similarly, the measurement CCD camera 22 receives the P-polarized light component L2 of the interference light L which passes through the polarization beam splitter 11, performs photoelectric conversion on the received P-polarized light component L2 to generate a detection signal, and outputs the detection signal to the signal processing portion 20.

The interference light L (thus S-polarized light component L1 and P-polarized light component L2) includes a plurality of interference light beams having different beat frequencies. Each of the detection signals outputted from the measurement CCD cameras 21 and 22 includes the beat frequency components of the plurality of interference light beams. A frequency of each of the beat frequency components is equal to the beat frequency of a corresponding interference light beam.

[Observation Optical System]

The observation optical system for observing the object to be measured O includes an observation light source 12 for generating, for example, observation light M of a visible region, a condenser lens 13 for condensing the observation light M, and a half mirror 14 for joining an optical path of the observation light M to the optical path of the signal light S to emit the observation light M to the object to be measured O. The half mirror 14 corresponds to an example of "joining means" in the present invention. The observation light source 12, the condenser lens 13, and the half mirror 14 correspond to an example of "illumination optical system" in the present invention.

The observation light M emitted to the object to be measured O is reflected on the object to be measured O and guided along the optical path of the signal light S. Then, the observation light M passes through the half mirror 6 and is guided along the optical path of the interference light L. After that, the observation light M is reflected on a beam splitter 15 to leave the optical path of the interference light L. The reflected observation light M is reflected on a reflecting mirror 16 and imaged onto a light receiving surface of an observation CCD camera 23 by an imaging lens 17.

The beam splitter 15 corresponds to an example of "separating means" in the present invention. For example, a dichroic mirror for reflecting light having a wavelength equal to that of the observation light M and transmitting light having a wavelength equal to that of the interference light L is used.

The observation CCD camera 23 corresponds to an example of "observation light receiving means" in the present invention and is a storage type two-dimensional photo sensor array for observation light detection as in each of the measurement CCD cameras 21 and 22. The observation CCD camera 23 receives the observation light M, performs photoelectric conversion on the received observation light M to generate a detection signal, and outputs the detection signal to the signal processing portion 20. The signal processing portion 20 causes the monitor device 30 to display an observation image of the object to be measured O based on the detection signal. The monitor device 30 corresponds to an example of "display means" in the present invention.

[Moving Stage]

The optical image measuring apparatus 1 according to this embodiment includes two moving stages (apparatus moving stage 40 and interferometer moving stage 50) provided therein. The interferometer moving stage 50 is mounted on the apparatus moving stage 40.

The broad band light source 2, the polarizing plate 3, the lenses 4 and 5, the half mirror 6, the wavelength plate 7, the reference mirror 8, and the piezoelectric element 9 of the measurement optical system and further the observation light source 12, the condenser lens 13, and the half mirror 14 of the observation optical system are mounted on the interferometer moving stage 50. Those members are integrally moved in an optical path direction of the signal light S, that is, in backward and forward directions relative to the object to be measured O by the interferometer moving stage 50. A moving direction of the interferometer moving stage 50 corresponds to a direction indicated by a double-headed arrow B shown in FIG. 1.

The interferometer moving stage 50 is operated at the time of image measurement and acts to adjust an optical path length of the signal light S to change an optical path difference between the signal light S and the reference light R, thereby changing an image measurement depth. The interferometer moving stage 50 corresponds to an example of a combination of "moving means" and "optical path length adjusting means" in the present invention. More specifically, the measurement light from the broad band light source 2 is the low-coherent light, so only the signal light S propagating a distance substantially equal to a propagating distance of the reference light R is useful to produce a beat component of the interference light L. In other words, only reflection light on a region of the object to be measured O in a z-coordinate position, which is located at a distance substantially equal to a distance to the reference mirror 8 relative to the half mirror 6 interferes with the reference light R to produce a beat frequency. Therefore, when the optical path length of the signal light S is subjected by the interferometer moving stage 50, it is possible to continuously extract reflection light on a region of the object to be measured O at each z-coordinate position.

As described above, it is necessary to adjust the optical path length at constant speed to perform preferable image measurement. Therefore, the interferometer moving stage 50 is controlled to move mounted members at predetermined constant speed. In particular, when the interferometer moving stage 50 starts moving from a standstill, a moving speed thereof accelerates at the start of moving. After the moving speed reaches a predetermined speed, the predetermined speed is controlled to be maintained.

The imaging lens group 10, the polarization beam splitter 11, and the measurement CCD cameras 21 and 22 of the measurement optical system, the beam splitter 15, the reflecting mirror 16, the imaging lens 17, the observation CCD camera 23 of the observation optical system are mounted on the apparatus moving stage 40 in addition to the interferometer moving stage 50 and the members mounted thereon. Those members are integrally moved in the optical path direction of the signal light S (direction indicated by a double-headed arrow A shown in FIG. 1) by the apparatus moving stage 40.

The apparatus moving stage 40 corresponds to an example of a combination of "focal point shifting means" and "observation light focusing means" in the present invention and is operated so as to achieve focus on a region to be observed by the examiner at the time of observation of the object to be measured O. The apparatus moving stage 40 acts to move the above-mentioned members in the optical path direction of the signal light S to focus the observation light M reflected on the object to be measured O to the light receiving surface of the observation CCD camera 23. The apparatus moving stage 40 can be moved in not only the Z-direction but also, for example, the x-direction or the y-direction. In addition, the apparatus moving stage 40 can be oscillated in a longitudinal direction or a lateral direction. When the examiner operates an observation operation unit such as a console which is not shown, the apparatus moving stage 40 is moved.

[With Respect to Focused States of Observation Light and Measurement Light]

Hereinafter, a relationship between a focused state of the observation light on the observation CCD camera 23 and a focused state of the measurement light on each of the measurement CCD cameras 21 and 22 will be described. A structure in which a focal position of the observation CCD camera 23 and a focal position of each of the measurement CCD cameras 21 and 22 are shifted from each other in advance is applied to the optical image measuring apparatus 1 according to this embodiment.

FIG. 1 illustrates a state in which the focus of the observation CCD camera 23 is achieved on an apparatus side surface of the object to be measured O, that is, a state in which an image point (observation image point) p corresponding to an object point (observation object point) P on the apparatus side surface of the object to be measured O is formed on the light receiving surface of the observation CCD camera 23. In other words, FIG. 1 illustrates a state in which the examiner is observing the apparatus side surface of the object to be measured O. The observation object point P and the observation image point p are optically conjugate with each other.

With such a state, an object point (measurement object point) Q for forming image points (measurement image points) q1 and q2 on the light receiving surfaces of the measurement CCD cameras 21 and 22 is displaced from the apparatus side surface of the object to be measured O to an apparatus side by a distance d. In other words, each of the measurement CCD cameras 21 and 22 has the measurement object point Q closer to the apparatus side than the observation object point P of the observation CCD camera 23, so that the focus is shifted from the apparatus side surface of the object to be measured O, which is located at the observation object point P. The distance d between the observation object point P and the measurement object point Q is set to a distance equal to or longer than a distance necessary to move the interferometer moving stage 50 which is at a standstill and accelerate the moving speed thereof to the predetermined speed. The distance d can be determined in view of, for example, the weight of the interferometer moving stage 50, the weight of the members mounted thereon, and a driving force of a driving device such as a linear actuator, of a stage driving mechanism 51 (described later) for driving the interferometer moving stage 50. Note that the measurement object point Q of the measurement CCD camera 21 and the measurement image point q1 are optically conjugate with each other and the measurement object point Q of the measurement CCD camera 22 and the measurement image point q2 are optically conjugate with each other.

The reflective surface of the reference mirror 8 is located in a position optically conjugate with the measurement image points q1 and q2 of the measurement CCD cameras 21 and 22 (conjugate point Q'). A conjugate point P' with respect to the observation image point p of the observation CCD camera 23 is displaced from the conjugate point Q' to a rear side of the reference mirror 8 by the distance d.

[Control System]

Next, the control system of the optical image measuring apparatus 1 will be described with reference to FIG. 2. The control system of the optical image measuring apparatus 1 includes the signal processing portion 20 serving as a main circuit, the measurement CCD cameras 21 and 22, the observation CCD camera 23, a measurement start switch 60, the piezoelectric element 9, stage, the stage driving mechanisms 41 and 51, the observation light source 12, the drive pulse generator 2A, and the display device 50.

The measurement start switch 60 corresponds to an example of "operating means" in the present invention. After an observation image displayed on the monitor device 30 is observed to determine a region for image measurement (measurement region), the measurement start switch 60 is operated to perform the image measurement on the measurement region. The measurement start switch 60 is composed of, for example, a control panel of the optical image measuring apparatus 1 or an input device (such as a keyboard or a mouse) of a computer apparatus which is used as a console of the optical image measuring apparatus 1 (both not shown). An observation start switch (not shown) which is operated to observe the object to be measured O and has the same structure as that of the measurement start switch 60 is provided in the optical image measuring apparatus 1.

The stage driving mechanism 41 has a mechanism for moving the apparatus moving stage 40. The stage driving mechanism 41 can include, for example, a linear actuator. Similarly, the stage driving mechanism 51 include, for example, a linear actuator and has a mechanism for moving the interferometer moving stage 50.

The signal processing portion 20 includes an apparatus control portion 24 for controlling the respective parts of the optical image measuring apparatus 1, an image forming portion 25 for forming an image based on the detection signals outputted from the measurement CCD cameras 21 and 22, a storing portion 26 for storing various data and computer programs.

(Apparatus Control Portion)

The apparatus control portion 24 includes an operation processing circuit such as a CPU and controls the operation of each of the apparatus parts such as the drive pulse generator 2A, the piezoelectric element 9, the observation light source 12, the stage driving mechanisms 41 and 51, the measurement CCD cameras 21 and 22, and the observation CCD camera 23. The apparatus control portion 24 controls the stage driving mechanism 41 in response to the operation of the observation operation unit to move the apparatus moving stage 40. The apparatus control portion 24 causes the monitor device 30 to display the observation image based on the detection signal inputted from the observation CCD camera 23. The apparatus control portion 24 performs processing for storing the image and various data in the storing portion 26 and processing for reading out information stored in the storing portion 26. The apparatus control portion 24 controls the respective apparatus parts in response to the operation of the observation start switch and the operation of the measurement start switch 60.

(Image Forming Portion)

The image forming portion 25 corresponds to an example of "image forming means" in the present invention and executes operation processing described in detail in [Measurement Principle] later to form a two-dimensional tomographic image of the object to be measured O or a three-dimensional image thereof based on the detection signals outputted from the measurement CCD cameras 21 and 22.

As described above, each of the detection signals from the measurement CCD cameras 21 and 22 includes various beat frequency components. The S-polarized light component L1 of the interference light L and the P-polarized light component L2 thereof are detected by the measurement CCD cameras 21 and 22 as pulse light beams each having a frequency equal to that of the measurement light beam H outputted from the broad band light source 2. The image forming portion 25 forms a tomographic image based on a beat frequency component corresponding to a beat frequency which is (substantially) equal to the frequency of the S-polarized light component L1 of the pulsed interference light L and the frequency of the P-polarized light component L2 thereof (that is, the frequency at which the measurement light beam H is outputted from the broad band light source 2), of a plurality of beat frequency components included in each of the detection signals. The detection signals corresponding to each of the pulsed measurement light beams periodically outputted from the broad band light source 2 are subsequently inputted from the measurement CCD cameras 21 and 22 to the image forming portion 25. The image forming portion 25 executes image forming processing based on the detection signals to subsequently form tomographic images.

The image forming portion 25 can form a three-dimensional image of the object to be measured O or a two-dimensional tomographic image thereof in an arbitrary direction based on tomographic images obtained at various measurement depths by the operation of the interferometer moving stage 50.

The image forming portion 25 executing the above-mentioned processings includes an operation control circuit such as a CPU for executing a computer program for image formation which is stored in the storing portion 26.

The image formed by the image forming portion 25 is stored in the storing portion 26 by the apparatus control portion 24 and displayed on the monitor device 30.

(Storing Portion)

The storing portion 26 includes a storage device such as an image memory, a hard disc drive, or a ROM. Although the single storing portion 26 is shown in FIG. 2, it may be actually composed of a plurality of storage devices.

A computer program for apparatus control, a computer program for image formation, and the like are stored in advance in the storing portion 26. An image formed by the image forming portion 25, an image detected by the observation CCD camera 23, and the like are stored in the storing portion 26.

[Measurement Principle]

Hereinafter, the basic principle of the image measurement performed by the optical image measuring apparatus 1 according to this embodiment will be described.

First, the measurement light H outputted from the broadband light source 2 is converted to the linearly polarized light in a direction forming an angle of 45° with respect to the x-axis and the y-axis, by the polarizing plate 3. The beam diameter of the converted linearly polarized light is increased by the lenses 4 and 5 and the linearly polarized light whose beam diameter is increased is converted to the parallel light flux thereby. Then, the light flux is incident on the half mirror 6 and divided into two, that is, the signal light S and the reference light R.

The signal light S is incident on the object to be measured O made of a scattering medium and reflected on a surface thereof and sectional surfaces at various depths. A part of a reflection light wave from the object to be measured O is reflected on the half mirror 6 and transmitted to the imaging lens group 10.

On the other hand, the reference light R passes through the (⅛) wavelength plate 7 and is reflected by the reference mirror 8 which is being vibrated by the piezoelectric element 9. Then, the reference light R passes through the wavelength plate 7 again and is incident on the half mirror 6. At this time, the polarization characteristic of the reference light R passing through the wavelength plate 7 two times is converted from the linear polarization of 45° to the circular polarization. A part of the reference light R whose polarization characteristic is converted to the circular polarization passes through the half mirror 6 and propagates to the imaging lens group 10.

At this time, the signal light S and the reference light R are superimposed on each other by the half mirror 6 to produce the interference light L. The interference light L propagates the polarization beam splitter 11 through the imaging lens group 10.

The polarization beam splitter 11 acts to reflect the S-polarized light component L1 of the interference light L and to transmit the P-polarized light component L2 thereof. The S-polarized light component L1 of the interference light L is detected by the measurement CCD camera 21 and the P-polarized light component L2 thereof is detected by the measurement CCD camera 22. The S-polarized light component L1 of the interference light L includes an S-polarized light component Ess of the signal light S and an S-polarized light component Ers of the reference light R. The P-polarized light component L2 of the interference light L includes a P-polarized light component Esp of the signal light S and a P-polarized light component Erp of the reference light R. The S-polarized light component Ess of the signal light S, the P-polarized light component Esp thereof, the S-polarized light component Ers of the reference light R, and the P-polarized light component Erp thereof each are expressed by the following expressions.

$$Ess = \sqrt{I_{ss}} \sin(2\pi ft + \phi) \quad (2)$$

$$Esp = \sqrt{I_{sp}} \sin(2\pi ft + \phi) \quad (3)$$

$$Ers = \sqrt{I_{rs}} \sin[2\pi(f+f_D)t + \phi'] \quad (4)$$

$$Erp = \sqrt{I_{rp}} \sin[2\pi(f+f_D)t + \phi' + 90°] \quad (5)$$

Here, f indicates a frequency of the measurement light H outputted from the broadband light source 2, $f_D$ indicates a frequency shift caused by the vibration of the reference mirror 8, $\phi$ indicates an initial phase of the signal light S, and $\phi'$ indicates an initial phase of the reference light R. It is assumed that a difference between the initial phase of the signal light S and the initial phase of the reference light R is given by $\Delta\phi(=\phi-\phi')$. Referring to the expressions (2) to (5), the S-polarized light component L1 of the interference light L and the P-polarized light component L2 thereof are detected by the measurement CCD cameras 21 and 22 as heterodyne signals $i_1$ and $i_2$ expressed by the following expressions.

$$i_1 \propto |E_{ss}+E_{rs}|^2 \propto I_{rs}+I_{ss}+2\sqrt{I_{rs}I_{ss}}\cos(2\pi f_D t + \Delta\phi) \quad (6)$$

$$i_2 \propto |E_{sp}+E_{rp}|^2 \propto I_{rp}+I_{sp}+2\sqrt{I_{rp}I_{sp}}\sin(2\pi f_D t + \Delta\phi) \quad (7)$$

As is apparent from the comparison between the expressions (6) and (7), a phase difference between the alternating signals of the third terms of the respective expressions is 90° because of the cosine and sine functions with the same phase.

Here, the apparatus control portion 24 controls the drive pulse generator 2A to generate a pulse signal having a frequency (substantially) equal to the amount of frequency shift applied to the reference light R by the vibration of the reference mirror 8 which is caused by the piezoelectric element 9. The broad band light source 2 is driven in response to the pulse signal and outputs the pulsed measurement light H having a frequency equal to that of the pulse signal. That is, the measurement light H is pulse light outputted at a frequency (substantially) equal to the beat frequency of the interference light L.

The measurement light H is outputted as, for example, pulsed light of a rectangular train with a duty of 50%. The duty ratio of the light beam is not limited to 50%. The pulse shape may be other than the rectangular train (for example, a triangular train or a trapezoidal train). For example, a light beam obtained by modulation between output intensities of 50 and 100 can be also applied instead of pulsed light obtained by switching between output intensities of 0 and 100. That is, the important point is not to control the modulation degree of the intensity of the light beam but to control a frequency for modulation of the intensity thereof such that the frequency becomes substantially equal to the beat frequency of the interference light L.

Next, a detection mode of the interference light L in the optical image measuring apparatus 1 according to this embodiment will be described with reference to graphs shown in FIGS. 3A to 3E. Hereinafter, assume that a modulation frequency of the intensity of the light beam outputted from the broadband light source 2 is indicated by $f_m$. As described above, $f_D$ indicates the frequency shift applied to the reference light R (beat frequency of the interference light L). It is assumed that the modulation frequency $f_m$ of the light beam is equal to or close to the frequency shift $f_D$.

Figure 3:
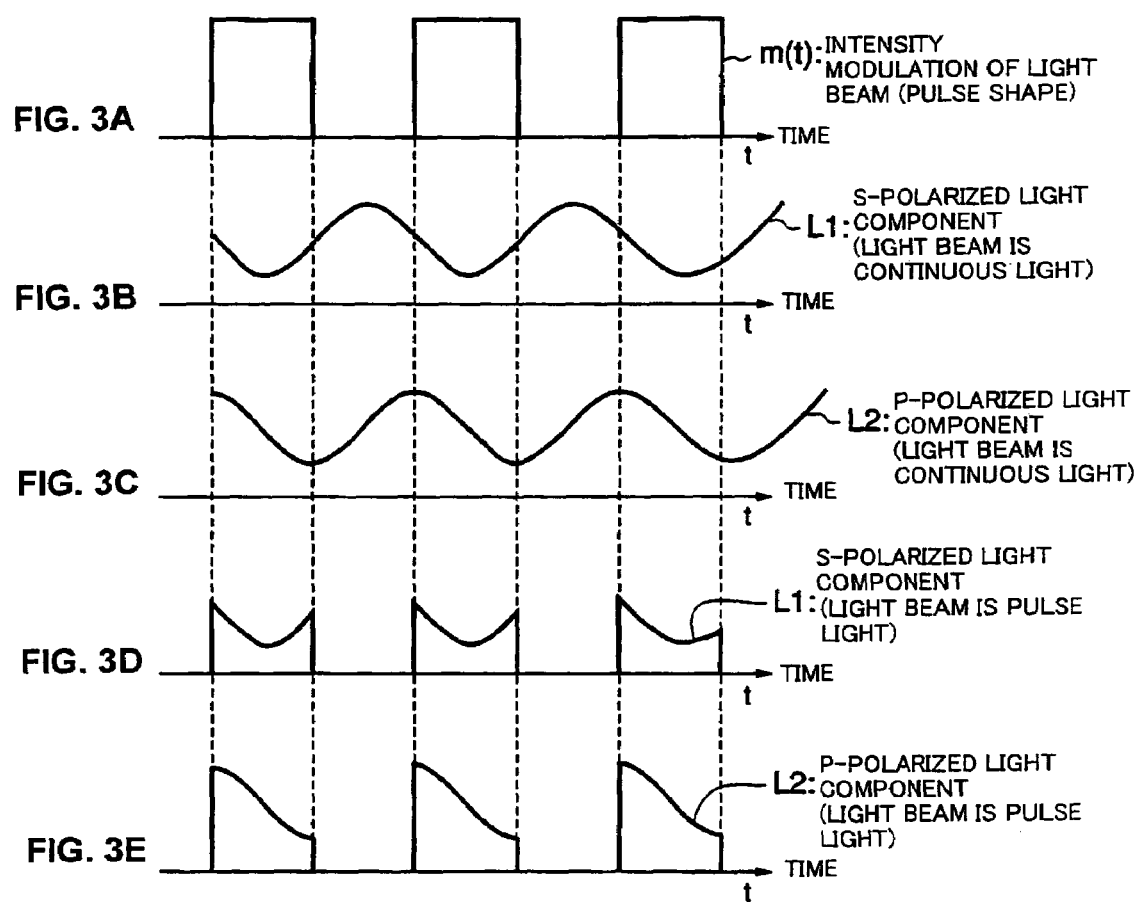

FIG. 3A shows a time waveform of a light beam which is subjected to intensity modulation at the modulation frequency $f_m$ and outputted from the broadband light source 2. FIG. 3B shows a time waveform of the S-polarized light component L1 of the interference light L (beat frequency $f_D$) in the case where the light beam is continuous light and thus the reference light R and the signal light S each are continuous light. FIG. 3C shows a time waveform of the P-polarized light component L2 of the interference light L in the case where the reference light R and the signal light S each are continuous light. Note that a phase difference between the S-polarized light component L1 and the P-polarized light component L2 as shown in FIGS. 3B and 3C is 90°.

FIG. 3D shows a time waveform of the S-polarized light component L1 of the interference light L in the case where the light beam from the broadband light source 2 is subjected to the intensity modulation as shown in FIG. 3A (this corresponds to FIG. 3B). FIG. 3E shows a time waveform of the P-polarized light component L2 of the interference light L in the case where the light beam from the broadband light source 2 is subjected to the intensity modulation as shown in FIG. 3A (this corresponds to FIG. 3C). A phase difference between the S-polarized light component L1 and the P-polarized light component L2 as shown in FIGS. 3D and 3E is 90°. Note that the light beams shown in FIGS. 3D and 3E correspond to the measurement light H.

The measurement CCD camera 21 detects the S-polarized light component L1 having the time waveform shown in FIG. 3D. The light beam from the broadband light source 2 is a light pulse of a rectangular train having the frequency $f_m$ and a duty of 50%. When a difference between the modulation frequency $f_m$ and the beat frequency $f_D$ of the interference light L, ($\delta f=|f_m-f_D|$), is sufficiently smaller than a response frequency of the measurement CCD camera 21, a detection signal of the S-polarized light component L1 which is outputted from the measurement CCD camera 21 becomes proportional to the amount of photo charge stored for a detection period. Therefore, the detection signal is expressed by the following expression (for example, see M. Akiba, K. P. Chan, and N. Tanno, Japanese Journal of Applied Physics, Vol. 39, L1194 (2000)).

$$S_1(t) = \langle K_1 m(t) i_1(t) \rangle \quad (8)$$

-continued $$= K_1\left[\frac{1}{2}I_{ss} + \frac{1}{2}I_{rs} + \frac{2}{\pi}\sqrt{I_{ss}I_{rs}}\cos(2\pi\delta ft + \beta)\right]$$

Here, <·> indicates a time average produced by a storage effect of the measurement CCD camera 21. In addition, $K_1$ indicates photo detection efficiency including reflectance of the polarization beam splitter 11 and a photoelectric conversion rate of the measurement CCD camera 21, m(t) indicates a function for modulating the output intensity of the broadband light source 2 (function indicating a rectangular pulse), and β indicates an initial phase value for measurement. As is apparent from the expression (8), the detection signal outputted from the measurement CCD camera 21 includes the term related to an amplitude $\sqrt{(I_{ss}I_{rs})}$ of the S-polarized light component L1 of the interference light L and a phase $(2\pi\delta ft+\beta)$ thereof in addition to the term related to the intensity of the signal light S and the term related to the intensity of the reference light R (background light component).

Similarly, the measurement CCD camera 22 detects the P-polarized light component L2 having the time waveform shown in FIG. 3E and outputs a detection signal as expressed by the following expression.

$$S_2(t) = K_2[\tfrac{1}{2}I_{sp} + \tfrac{1}{2}I_{rp} + 2/\pi\sqrt{I_{sp}I_{rp}}\sin(2\pi\delta ft+\beta)] \quad (9)$$

Here, $K_2$ indicates photo detection efficiency including transmittance of the polarization beam splitter 11 and a photoelectric conversion rate of the measurement CCD camera 22.

Next, calculation processing of the signal intensity of the interference light L based on the detection signals (expressed by the expressions (8) and (9)) outputted from the measurement CCD cameras 21 and 22 will be described.

Because the reference light R is converted to the circularly polarized light by the wavelength plate 7, it can be considered that an intensity $I_{rs}$ of the S-polarized light component Ers of the reference light R is equal to an intensity $I_{rp}$ of the P-polarized light component Erp thereof (this indicates $I_{rs}=I_{rp}=I_r$).

On the other hand, it is considered that the reflection light of the signal light S on the object to be measured O does not significantly depend on the polarization characteristic of the incident light thereof, so it can be considered that an intensity $I_{ss}$ of the S-polarized light component Ess of the signal light S is equal to or close to the intensity $I_{sp}$ of the P-polarized light component Esp thereof (this indicates $I_{ss}=I_{sp}=I_s$). Because the signal light S is scattered or absorbed in the object to be measured O, it can be assumed that the intensity thereof is generally sufficiently smaller than that of the reference light R ($I_s<<I_r$).

The first term and the second term of the right side of each of the expressions (8) and (9) indicate the intensity of the background light. The intensity of the background light can be measured in advance or separately. For example, a light beam which is continuous light is outputted from the broadband light source 2 and detected by the measurement CCD camera 21 and the like. The detected light beam is integrated for a period corresponding to one wavelength (or integral multiple thereof) and the third term (alternating current component; phase quadrature component) is cancelled. Therefore, it is possible to obtain the intensity of the background light (background light component).

The obtained background light component is divided by the intensities of the detection signals from the measurement CCD cameras 21 and 22 to calculate phase quadrature components of the detection signals, that is, a phase quadrature component $S_1'(t)$ of the S-polarized light component L1 of the interference light L and a phase quadrature component $S_2'(t)$ of the P-polarized light component L2 thereof (see the following expressions).

$$S_1'(t) = K_1 2/\pi\sqrt{I_sI_r}\cos(2\pi\delta ft+\beta) \quad (10)$$

$$S_2'(t) = K_2 2/\pi\sqrt{I_sI_r}\sin(2\pi\delta ft+\beta) \quad (11)$$

When the expressions (10) and (11) are used, the amplitude of the S-polarized light component L1 of the interference light L and the amplitude of the P-polarized light component L2 thereof are expressed by the following expression.

$$\sqrt{I_sI_r} \propto \sqrt{S_1'^2 + S_s'^2} \quad (12)$$

The optical image measuring apparatus 1 according to this embodiment produces an image of a spatial phase distribution of the interference light L as follows.

It is assumed that, at a measurement time $t=t_1$, a phase quadrature component $S_1'(t_1)$ of the S-polarized light component L1 of the interference light L is detected by the measurement CCD camera 21 and a phase quadrature component $S_2'(t_1)$ of the P-polarized light component L2 thereof is detected by the measurement CCD camera 22. When a ratio between both the phase quadrature components is calculated, the following signal is obtained.

$$S_3 = \frac{S_2'(t_1)}{S_1'(t_1)} = \tan(2\pi\delta ft_1 + \beta) \quad (13)$$

As is apparent from the expression (13), a signal $S_3$ expressed thereby does not depend on the amplitude of the interference light L and is composed of only phase information. In this embodiment, the S-polarized light component L1 and the P-polarized light component L2 are detected by the measurement CCD cameras 21 and 22, each of which has a light receiving surface on which a plurality of pixels are two-dimensionally arranged. Therefore, a phase β(x, y, $t_1$) of a signal detected from each of the pixels is expressed by the following expression (where (x, y) indicates coordinates of each of the pixels on the light receiving surface).

$$\beta(x, y, t_1) = \tan^{-1}\left[\frac{S_2'(x, y, t_1)}{S_1'(x, y, t_1)}\right] - 2\pi\delta ft_1 \quad (14)$$

The second term of the expression (14) is an instantaneous phase value of an alternating current signal having a frequency δf of zero or substantially zero (≈0) at the measurement time $t_1$, so it can be considered that the phase value is maintained constant regardless of the positions of the pixels of the measurement CCD cameras 21 and 22, that is, the coordinates (x, y) thereof. Therefore, for example, a difference between a reference phase φ ($x_1$, $y_1$, $t_1$) of a detection signal detected from a pixel located at a specific point ($x=x_1$, $y=y_1$) on the light receiving surface of each of the measurement CCD cameras 21 and 22 and a phase of a detection signal detected from each of the pixels is obtained. Thus, it is possible to image a spatial phase difference distribution of the heterodyne signals, that is, a spatial phase difference distribution of the interference light L.

The frequency information of the interference light L can be also obtained from the phase information thereof. It is assumed that the phases of the interference light L (S-polarized light component L1 and P-polarized light component L2) at two measurement times $t=t_1$ and $t=t_2$ are denoted by $\beta(x, y, t_1)$ and $\beta(x, y, t_2)$. Then, the difference $\delta f$ between the beat frequency $f_D$ of the interference light L and the modulation frequency $f_m$ of the light beam from the broadband light source 2 is expressed by the following expression.

$$\delta f = \frac{1}{2\pi} \left| \frac{\beta(x, y, t_1) - \beta(x, y, t_2)}{t_1 - t_2} \right| \quad (15)$$

Because the modulation frequency $f_m$ of the light beam is known, the heterodyne frequency, that is, the beat frequency $f_D$ of the interference light L can be calculated based on the expression (10) or (11).

[Processing Mode]

Figure 4:
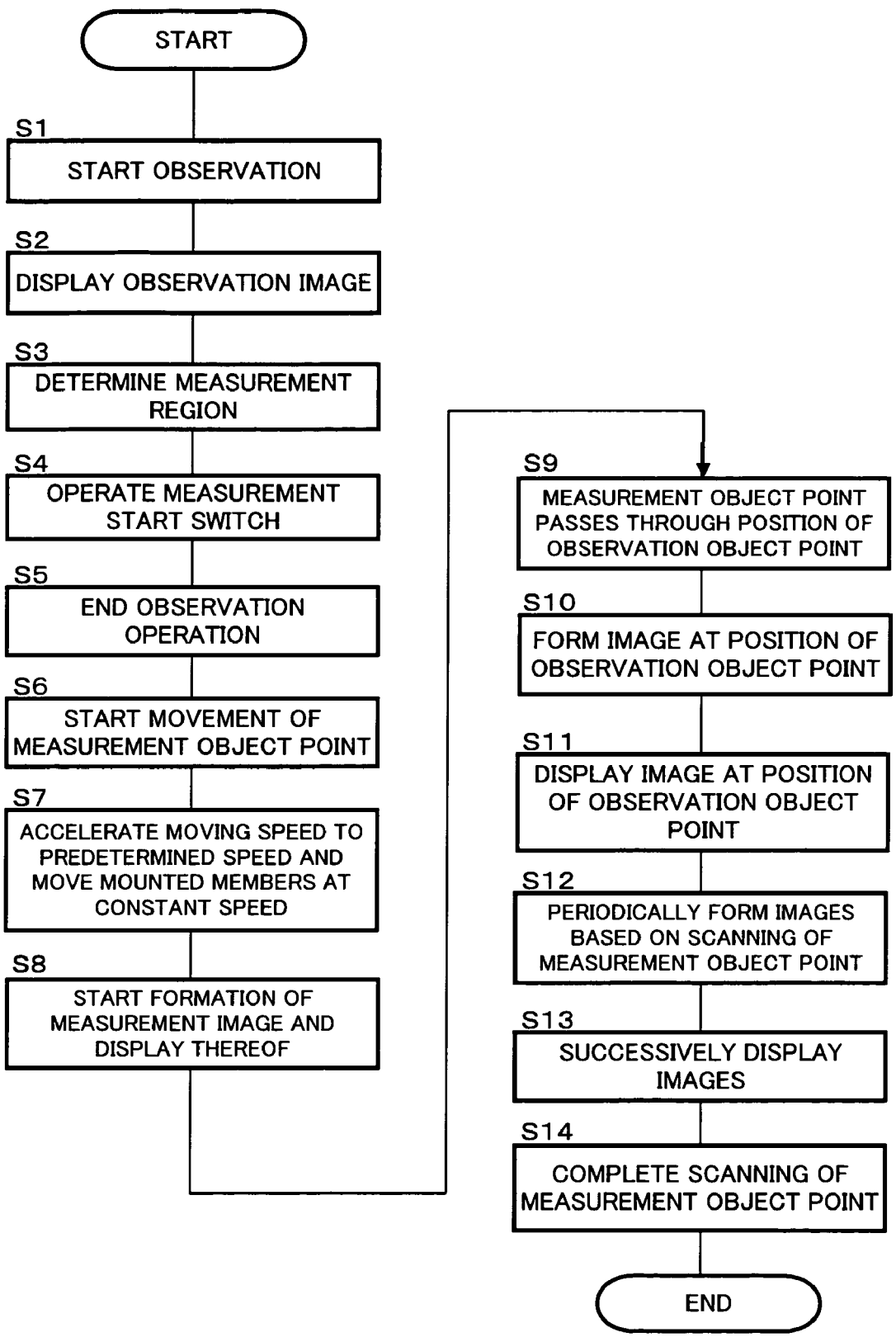
FIG. 4 is a flow chart of an example of a processing mode executed by the optical image measuring apparatus according to the first embodiment of the present invention.

A processing mode executed by the optical image measuring apparatus 1 according to this embodiment as described above will be described. First, the optical image measuring apparatus 1 is used to observe the object to be measured O, and a measurement region is determined by the examiner. Then, the optical image measuring apparatus 1 is used to perform image measurement on the measurement region. FIG. 4 is a flow chart showing an example of the processing mode executed by the optical image measuring apparatus 1.

First, when the observation start switch is operated by the examiner to observe the object to be measured O (Step S1), the apparatus control portion 24 turns on the observation light source 12 and causes the monitor device 30 to display the observation image based on the detection signal outputted from the observation CCD camera 23 (Step S2). The examiner operates the observation operation unit to move the apparatus moving stage 40 while viewing the displayed observation image. Therefore, the focus is achieved for observation on various regions of the object to be measured O to determine the measurement region for image measurement (Step S3).

At this time, the observation object point of the observation CCD camera 23 is located on, for example, the apparatus side surface (observation object point P) of the object to be measured O as shown in FIG. 1. Therefore, the observation image in which the focus is achieved on the apparatus side surface of the object to be measured O is displayed on the monitor device 30. The measurement object point of each of the measurement CCD cameras 21 and 22 is shifted from the observation object point to the apparatus side by the distance d (measurement object point Q). The conjugate point Q' with the measurement image point p of each of the measurement CCD cameras 21 and 22 is located on the reflective surface of the reference mirror 8.

After the determination of the measurement region, the examiner operates the measurement start switch 60 to start the image measurement (Step S4). The apparatus control portion 24 turns off the observation light source 12 in response to a measurement start request and stops the operation of the observation CCD camera 23 to end the observation operation (Step S5).

In response to the operation of the measurement start switch 60 (Step S4), the apparatus control portion 24 controls the stage driving mechanism 51 to drive the interferometer moving stage 50, thereby moving the mounted members so as to be close to the object to be measured O (Step S6). Therefore, the measurement object point Q of each of the measurement CCD cameras 21 and 22 is gradually shifted to the position of the observation object point P. In addition, the apparatus control portion 24 gradually accelerates the moving speed of the mounted members of the interferometer moving stage 50 up to a predetermined speed and holds the moving speed which reaches the predetermined speed to move the mounted members at a constant speed (Step S7). At this time, as described above, the moving speed of the interferometer moving stage 50 reaches the predetermined speed before the measurement object point Q reaches the observation object point P.

In response to the operation of the measurement start switch 60 (Step S4), the apparatus control portion 24 controls the drive pulse generator 2A to output the measurement light H from the broad band light source 2, controls the piezoelectric element 9 to vibrate the reference mirror 8, controls the image forming portion 25 to form an image (measurement image) based on the detection signals outputted from the measurement CCD cameras 21 and 22, and causes the monitor device 30 to display the measurement image (Step S8). A high-quality measurement image is not obtained until the moving speed of the interferometer moving stage 50 becomes constant.

When the measurement object point Q passes through the position of the observation object point P (Step S9), the image forming portion 25 forms an image at the position of the observation object point P (apparatus side surface of the object to be measured O) based on the detection signals from the measurement CCD cameras 21 and 22 and transmits the image to the apparatus control portion 24 (Step S10). At this time, the moving speed of the interferometer moving stage 50 is constant, so that the image at the position of the observation object point P is preferably formed. The apparatus control portion 24 causes the monitor device 30 to display the formed image (Step S11).

The image forming portion 25 periodically forms images based on the movement of the measurement object point Q in the z-direction (scanning in image measurement depth direction) (Step S12). The periodically formed images are successively displayed on the monitor device 30 (Step S13). After the scanning of the measurement object point Q is completed (Step S14), the image measurement is ended. The measured images can be stored in the storing portion 26 or the like by the examiner if necessary.

[Operation and Effect]

According to the optical image measuring apparatus 1 in this embodiment, which is operated as described above, the measurement object point Q of each of the measurement CCD cameras 21 and 22 is shifted from the observation object point P by the distance d at the time of observation of the object to be measured O. Then, the measurement object point Q moves to the position of the observation object point P in response to the operation of the measurement start switch 60. The measurement object point Q passes through the position of the observation object point P after the moving speed is accelerated until it becomes the predetermined speed. In other words, first, the focus of each of the measurement CCD cameras 21 and 22 is achieved so as to measure a position shifted from the observation position (observation depth) of the object to be measured O by the distance d. The position to be measured (focused position) is being shifted to the observation position in response to the measurement start trigger. After the moving speed becomes the predetermined speed, the position to be measured passes through the observation position. Therefore, according to the optical image measuring apparatus 1 in this embodiment, the image measurement can be speedily started after the input of the measurement start trigger. Thus, it is possible to preferably obtain the image at the position of the observation object point P (image of a region observed at the time of determination of the measurement region).

Modified Examples

Hereinafter, various modified examples of the optical image measuring apparatus according to the present invention will be described.

The optical image measuring apparatus 1 according to this embodiment has the structure in which the optical path length of the signal light S (between the half mirror 6 and the apparatus side surface of the object to be measured O) is adjusted by the interferometer moving stage 50 to perform the scanning of the image measurement depth. It is also possible to use a structure in which the reference mirror 8 is moved in the optical path direction of the reference light R to adjust the optical path length of the reference light R. That is, in the present invention, it is only necessary to provide the optical path length adjusting means capable of adjusting the optical path length difference between the signal light S and the reference light R to change the image measurement depth. The optical path length adjusting means for driving the reference mirror 8 includes reference object moving means such as a linear actuator or a piezoelectric element. The reference object moving means is controlled such that the reference mirror 8 starts to move in response to the input of the image measurement start trigger and the moving speed of the reference mirror 8 is maintained to be constant before the measurement object point Q is shifted by a predetermined distance (distance d).

In the above-mentioned embodiment, the structure is employed in which the two polarized light components L1 and L2 of the interference light L are detected by the two measurement CCD cameras 21 and 22 to measure the image. The structure according to the present invention can be applied to an arbitrary optical image measuring apparatus having the structure in which the optical path length difference between the signal light and the reference light is adjusted to perform the scanning of the image measurement depth.

In the above-mentioned embodiment, the reference mirror 8 and the piezoelectric element 9 are used for frequency shifting means for shifting the frequency of the signal light S and the frequency of the reference light R relative to each other. A frequency shifter composed of an acoustooptic device or the like can be also used. The frequency shifter is disposed on, for example, the optical path of the reference light R and acts to modulate the frequency of the reference light R.

In the above-mentioned embodiment, the measurement object point Q is formed in a position shifted from the observation object point P in a apparatus direction by the distance d. The measurement object point Q may be formed in a position shifted from the observation object point P in a direction reverse to the apparatus direction by the distance d. In this case, a scanning direction of the image measurement depth is reversed. (Although the scanning direction in the above-mentioned embodiment is a "+z direction", the scanning direction in this modified example is a "−z direction". In other words, the moving directions of the interferometer moving stage 50 in the above-mentioned embodiment and this modified example are reversed to each other.)

The structure according to the present invention can be applied to, for example, an optical image measuring apparatus in which measurement light which is a continuous light beam is divided into signal light and reference light, the signal light passing through the object to be measured and the reference light passing through the reference object are superimposed on each other to produce interference light, the interference light is divided into two interference light beams by a half mirror, the two interference light beams are sampled by two shutters, and the sampled interference light beams are detected by measurement CCD cameras. In order to perform sampling, each of the shutters periodically cuts off the interference light beam at a predetermined frequency in response to a timing signal from a phase shifter or the like. At this time, a phase difference of, for example, 90° or 180° is provided between the two shutters. In such optical image measuring apparatus, for example, when the scanning of the image measurement depth is performed by moving the reference object to adjust the optical path length of the reference light, the structure according to the present invention can be applied thereto.

Figure 5:
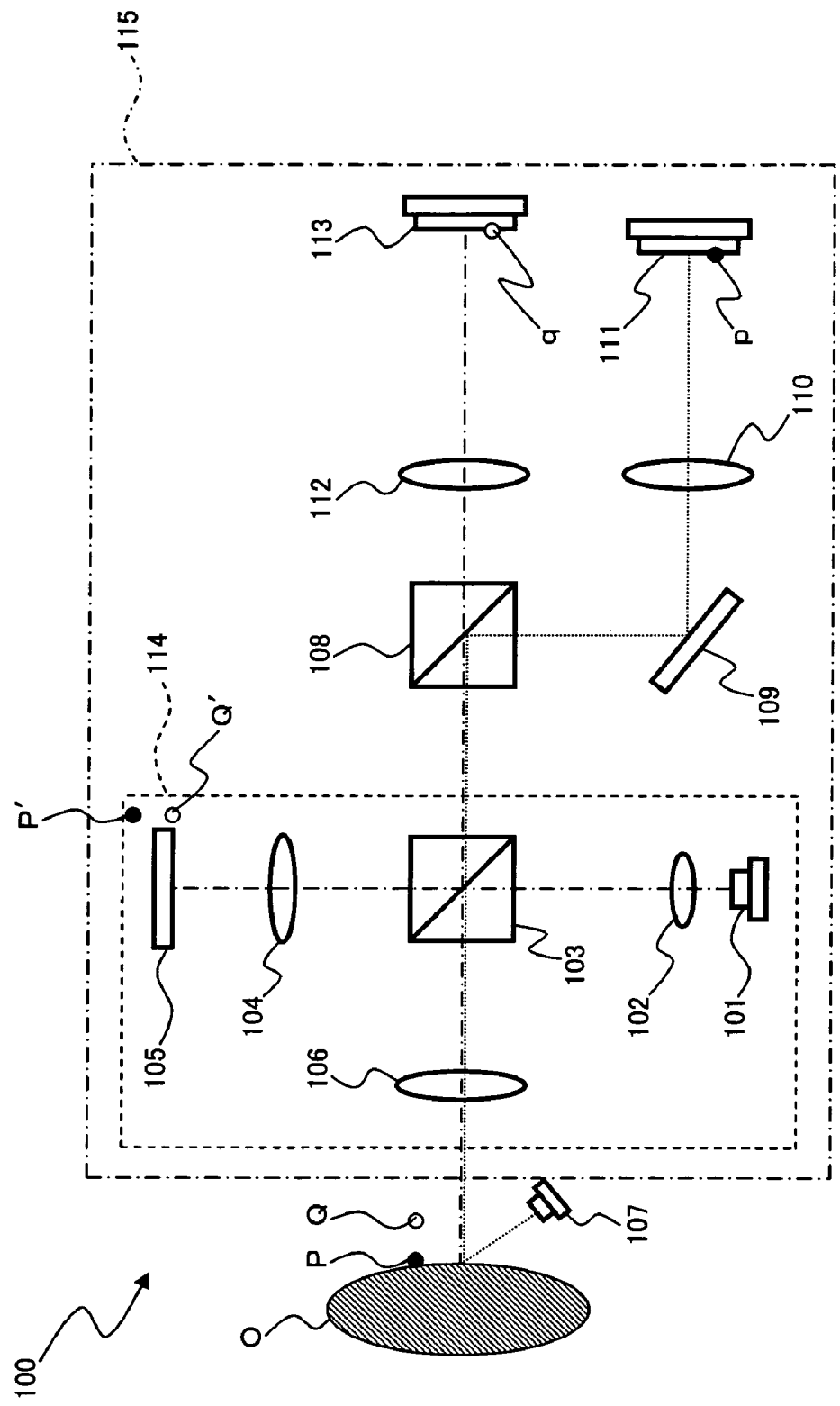
FIG. 5 is a schematic diagram showing a modified example of the configuration of the optical system of the optical image measuring apparatus according to the present invention.

FIG. 5 illustrates a modified example of the optical system of the optical image measuring apparatus according to the present invention. The control system has the same structure as that in the above-mentioned embodiment. An optical image measuring apparatus 100 shown in FIG 5 includes a broad band light source 101, a condenser lens 102, a prism type half mirror 103, a condenser lens 104, a reference mirror 105, an objective lens 106, an observation light source 107, a prism type dichroic mirror 108, a reflecting mirror 109, an imaging lens 110, an observation CCD camera 111, an imaging lens 112, a measurement CCD camera 113, an interferometer moving stage 114, and an apparatus moving stage 116.

The observation light source 107 emits observation light to the object to be measured O in an oblique direction relative to an optical path between the prism type half mirror 103 and the object to be measured O (optical path of the signal light). A light source for generating the observation light to the object to be measured O in the oblique direction relative to the optical path of the signal light S can be used as the observation light source in the above-mentioned embodiment.

The broad band light source 101, the condenser lens 102, the prism type half mirror 103, the condenser lens 104, the reference mirror 105, and the objective lens 106 are mounted on the interferometer moving stage 114 to be movable in the optical path direction of the signal light. The broad band light source 101, the condenser lens 102, the prism type half mirror 103, the condenser lens 104, the reference mirror 105, the objective lens 106, the prism type dichroic mirror 108, the reflecting mirror 109, the imaging lens 110, the observation CCD camera 111, the imaging lens 112, and the measurement CCD camera 113 are mounted on the apparatus moving stage 116 to be movable in the optical path direction of the signal light.

FIG. 5 illustrates a state in which the focus of the observation CCD camera 111 is achieved on the apparatus side surface of the object to be measured O, that is, a state in which the observation image point p corresponding to the observation object point P on the apparatus side surface of the object to be measured O is formed on a light receiving surface of the observation CCD camera 111. Such a state corresponds to a state in which the examiner is observing the apparatus side surface of the object to be measured O. The observation object point P and the observation image point p are optically conjugate with each other.

With such a state, the measurement object point Q for forming the measurement image point q on the light receiving surface of the measurement CCD camera 113 is displaced from the apparatus side surface of the object to be measured O to the apparatus side by a predetermined distance. A focal position of the measurement CCD camera 113 is outside the position of the observation object point P (apparatus side surface of the object to be measured O). The distance between the observation object point P and the measurement object point Q is set to a distance equal to or longer than a distance necessary to move the interferometer moving stage 114 which is at a standstill and accelerate a moving speed thereof to a predetermined speed. Note that the measurement object point Q of the measurement CCD camera 113 and the measurement image point q thereof are optically conjugate with each other.

The reflective surface of the reference mirror 105 is located in a position optically conjugate with the measurement image point q of the measurement CCD camera 113 (conjugate point Q'). The conjugate point P' with the observation image point p of the observation CCD camera 111 is displaced from the conjugate point Q' to a rear side of the reference mirror 105 by the predetermined distance.

The object to be measured O is observed as follows by the optical image measuring apparatus 100. The observation light emitted from the observation light source 107 is reflected on the object to be measured O. The reflection light of the observation light passes through the objective lens 106 and the prism type half mirror 103, and is reflected on the prism type dichroic mirror 108. Then, the reflection light is reflected on the reflecting mirror 109 and focused on the observation CCD camera 111 by the imaging lens 110. Therefore, an observation image is displayed on a monitor device which is not shown.

The image measurement is performed as follows by the optical image measuring apparatus 100. Measurement light outputted from the broad band light source 101 is focused on a reflective surface of the prism type half mirror 103 by the condenser lens 102. The measurement light is divided by the prism type half mirror 103 into the signal light propagating to the object to be measured O and the reference light propagating to the reference mirror 105. The reference light is focused on a reflective surface of the reference mirror 105 by the condenser lens 104 and reflected on the reflective surface thereof. The reflected reference light is incident on the prism type half mirror 103. On the other hand, the signal light is emitted to the object to be measured O through the objective lens 106. Reflection light of the signal light is incident on the prism type half mirror 103 through the objective lens 106. The signal light and the reference light are superimposed on each other by the prism type half mirror 103 to produce the interference light. The interference light passes through the prism type dichroic mirror 108, and is focused on the measurement CCD camera 113 by the imaging lens 112. A signal processing unit which is not shown forms an image based on a detection signal outputted from the measurement CCD camera 113 and causes the monitor device to display the formed image.

A processing mode of the optical image measuring apparatus 100 will be described. When the measurement start trigger is inputted by the examiner after the determination of the measurement region (corresponding to Step S4), the illumination light source 107 is turned off and the operation of the observation CCD camera 111 is stopped to end the observation operation (corresponding to Step S5).

In response to the input of the measurement start trigger, the interferometer moving stage 114 starts to move to the object to be measured O (corresponding to Step S6). Therefore, the measurement object point Q of the measurement CCD camera 113 is gradually shifted to the position of the observation object point P. In addition, a moving speed of the mounted members of the interferometer moving stage 114 gradually accelerates to a predetermined speed and the mounted members are moved at constant speed after the moving speed reaches the predetermined speed (corresponding to Step S7). The moving speed of the interferometer moving stage 114 reaches the predetermined speed before the measurement object point Q reaches the observation object point P.

In response to the input of the measurement start trigger, the measurement light is outputted from the broad band light source 2, a measurement image is formed based on the detection signal from the measurement CCD camera 113, and the formed measurement image is displayed on the monitor device 30 (corresponding to Step S8).

When the measurement object point Q passes through the position of the observation object point P (corresponding to Step S9), the signal processing unit forms an image at the position of the observation object point P (apparatus side surface of the object to be measured O) based on the detection signal from the measurement CCD camera 113 and causes the monitor device 30 to display the formed image (corresponding to Steps S10 and S11).

The signal processing unit periodically forms images based on scanning of the measurement object point Q in the image measurement depth direction and causes the monitor device 30 to successively display the formed images (corresponding to Steps S12 and S13). After the scanning of the measurement object point Q is completed, the image measurement is ended (corresponding to Step S14).

As in the above-mentioned embodiment, even in the optical image measuring apparatus 100, the image measurement can be speedily started after the input of the measurement start trigger. Thus, it is possible to preferably obtain the image at the position of the observation object point P, that is, the image of a region observed at the time of determination of the measurement region.

The above-mentioned modified examples can be applied in embodiments described later.

Second Embodiment

Figure 6:
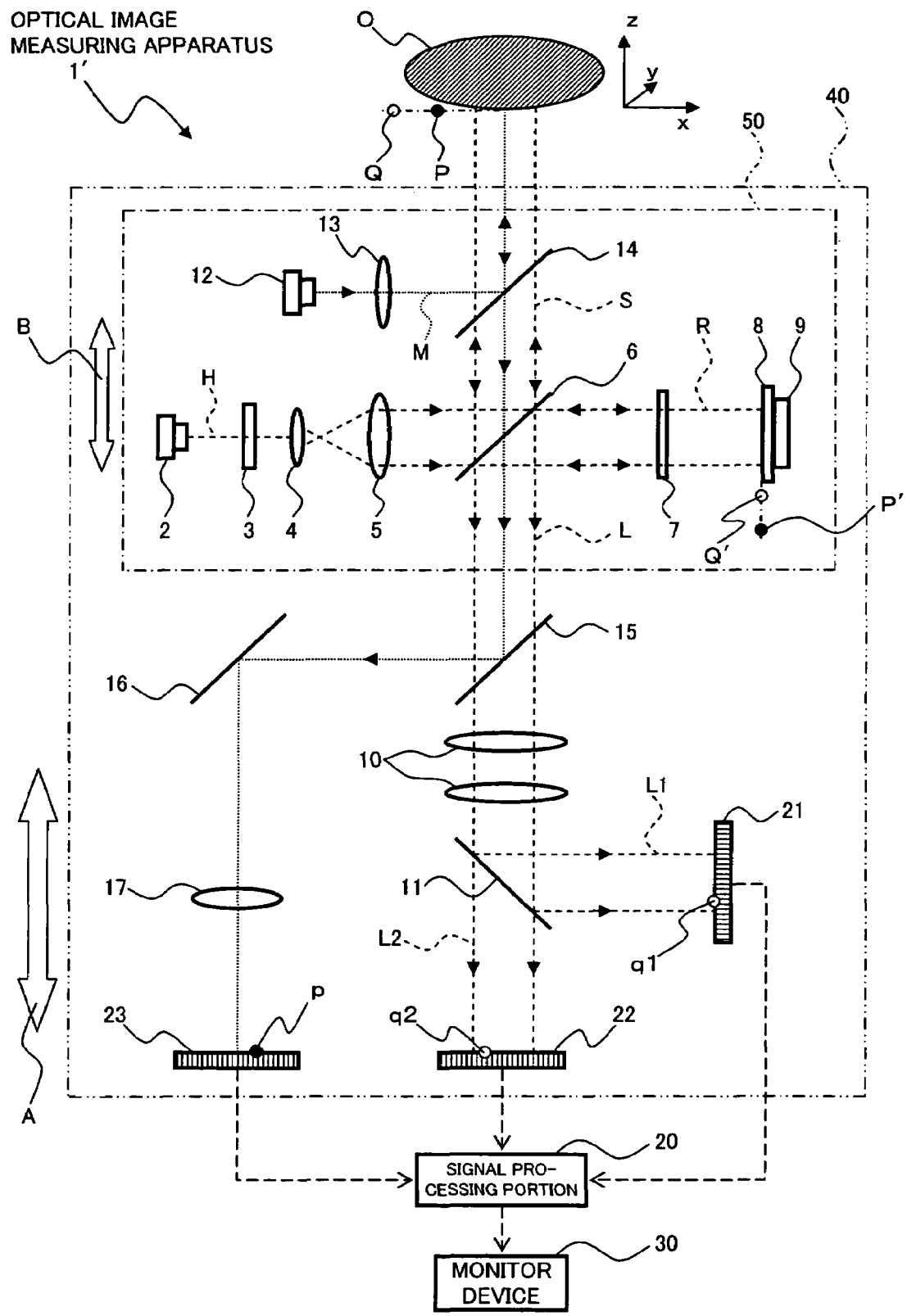
FIG. 6 is a schematic diagram showing an example of a configuration of an optical system of an optical image measuring apparatus according to a second embodiment of the present invention.

An optical image measuring apparatus according to a second embodiment of the present invention will be described. FIG. 6 illustrates an example of an optical system of an optical image measuring apparatus 1' according to this embodiment.

The optical image measuring apparatus 1' according to this embodiment has substantially the same optical structure as that of the optical image measuring apparatus 1 according to the first embodiment (this will be described using the same reference symbols as those shown in FIG. 1). A different point between the optical system of the optical image measuring apparatus 1' and the optical system in the first embodiment is only a relationship between the focused state of the observation light and the focused state of the measurement light. The control system has the same structure as that in the first embodiment (see FIG. 2).

In this embodiment, the focal position of the observation CCD camera 23 and the focal position of each of the measurement CCD cameras 21 and 22 are aligned with each other in advance. FIG. 6 illustrates a state in which the focus of the observation CCD camera 23 is achieved on the apparatus side surface of the object to be measured O, that is, a state in which the observation image point p corresponding to the observation object point P on the apparatus side surface of the object to be measured O is formed on the light receiving surface of the observation CCD camera 23. With such a state, the measurement object point Q for forming the measurement image points q1 and q2 on the light receiving surfaces of the measurement CCD cameras 21 and 22 is aligned with the position of the observation object point P. The reflective surface of the reference mirror 8 is located in a position optically conjugate with the measurement image points q1 and q2 of the measurement CCD cameras 21 and 22 (conjugate point Q'). The conjugate point P' with the observation image point p of the observation CCD camera 23 is aligned with the conjugate point Q'.

Figure 7:
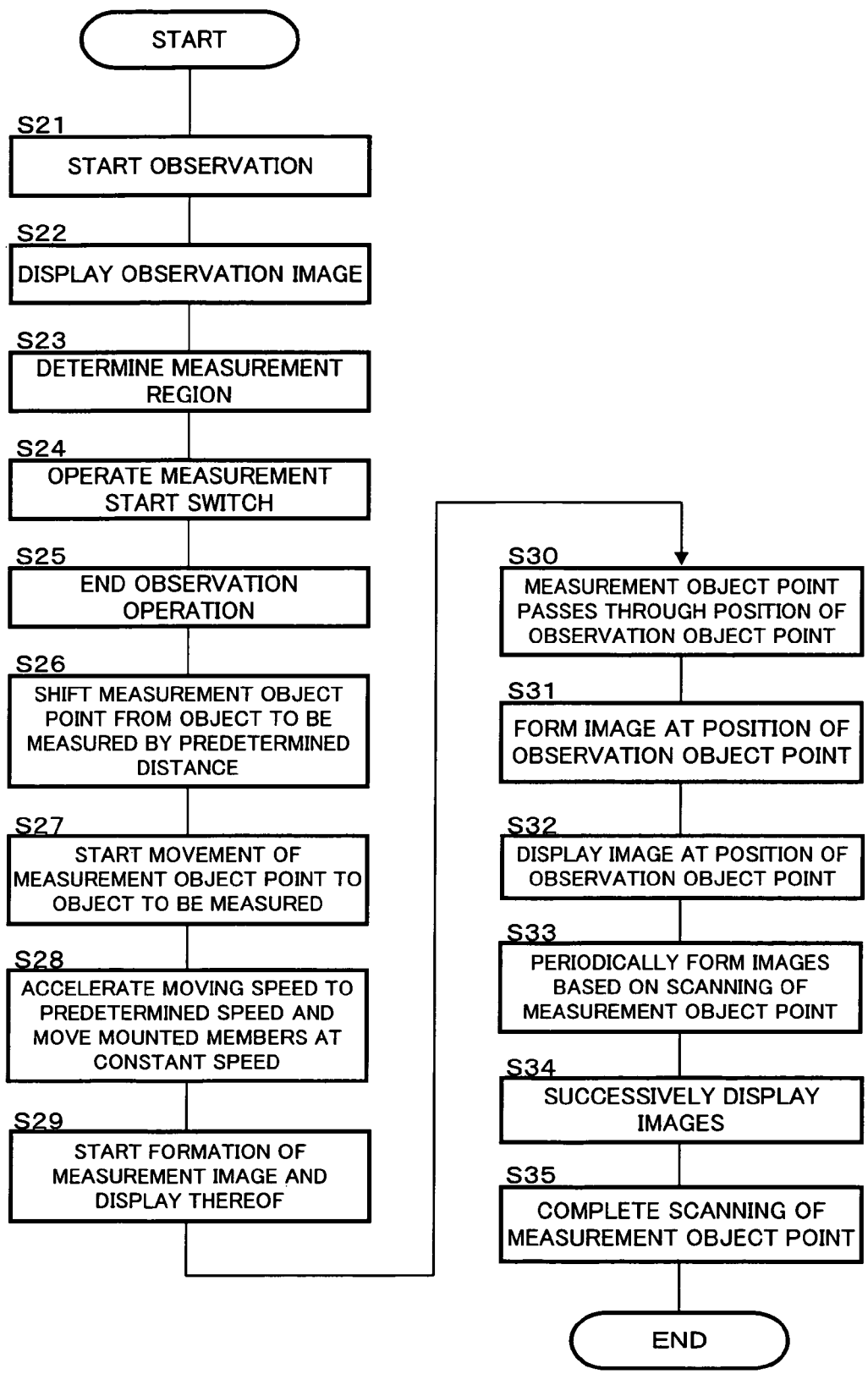
FIG. 7 is a flow chart of an example of a processing mode executed by the optical image measuring apparatus according to the second embodiment of the present invention.

An example of a processing mode executed by the optical image measuring apparatus 1' according to this embodiment as described above will be described with reference to a flow chart shown in FIG. 7.

When the observation start switch is operated by the examiner (Step S21), the apparatus control portion 24 turns on the observation light source 12 and causes the monitor device 30 to display the observation image based on the detection signal from the observation CCD camera 23 (Step S22). While the examiner views the displayed observation image, the examiner performs observation on focused various regions of the object to be measured O to determine the measurement region (Step S23).

At this time, the observation object point of the observation CCD camera 23 is located on, for example, the apparatus side surface (observation object point P) of the object to be measured O as shown in FIG. 6. Therefore, the observation image in which the focus is achieved on the apparatus side surface of the object to be measured O is displayed on the monitor device 30. The position of the measurement object point Q of each of the measurement CCD cameras 21 and 22 is aligned with the observation object point P.

After the determination of the measurement region, the examiner operates the measurement start switch 60 (Step S24). In response to a measurement start request, the apparatus control portion 24 turns off the observation light source 12 and stops the operation of the observation CCD camera 23 to end the observation operation (Step S25).

In response to the operation of the measurement start switch 60 (Step S24), the apparatus control portion 24 controls the stage driving mechanism 51 to move the interferometer moving stage 50 in a direction reversed to the object to be measured O (−z direction) by a predetermined distance (Step S26).

As in the case of the "distance d" in the first embodiment, the "predetermined distance" is set to a distance equal to or longer than a distance necessary to move the interferometer moving stage 50 which is at a standstill and accelerate the moving speed thereof to a predetermined speed.

After the interferometer moving stage 50 is moved by the predetermined distance, the interferometer moving stage 50 starts to move in a reverse direction (+z direction), thereby moving the mounted members to the object to be measured O (Step S27). Therefore, the measurement object point Q of each of the measurement CCD cameras 21 and 22 is gradually shifted to the position of the observation object point P. In addition, the apparatus control portion 24 gradually accelerates the moving speed of the mounted members of the interferometer moving stage 50 to the predetermined speed and holds the moving speed which reaches the predetermined speed to move the mounted members at constant speed (Step S28). At this time, as described above, the moving speed of the interferometer moving stage 50 reaches the predetermined speed to become a constant speed before the measurement object point Q which is temporarily shifted reaches the observation object point P (before the interferometer moving stage 50 moves the predetermined distance).

In response to the operation of the measurement start switch 60 (Step S24), the apparatus control portion 24 controls the drive pulse generator 2A to output the measurement light H from the broad band light source 2, controls the piezoelectric element 9 to vibrate the reference mirror 8, controls the image forming portion 25 to form a measurement image based on the detection signals from the measurement CCD cameras 21 and 22, and causes the monitor device 30 to display the measurement image (Step S29). A high-quality measurement image is not obtained until the moving speed of the interferometer moving stage 50 becomes constant.

When the measurement object point Q passes through the position of the observation object point P (Step S30), the image forming portion 25 forms an image at the position of the observation object point P based on the detection signals from the measurement CCD cameras 21 and 22 and transmits the image to the apparatus control portion 24 (Step S31). At this time, the moving speed of the interferometer moving stage 50 is constant, so the image at the position of the observation object point P is preferably formed. The apparatus control portion 24 causes the monitor device 30 to display the formed image (Step S32).

The image forming portion 25 periodically forms images based on the movement of the measurement object point Q in the z-direction (scanning in image measurement depth direction) (Step S33). The periodically formed images are successively displayed on the monitor device 30 (Step S34). After the scanning of the measurement object point Q is completed (Step S35), the image measurement is ended. The measured images can be stored in the storing portion 26 or the like by the examiner if necessary.

According to the optical image measuring apparatus 1' in this embodiment, the measurement object point Q of each of the measurement CCD cameras 21 and 22 and the observation object point P are at the same position at the time of observation of the object to be measured O. The measurement object point Q is shifted from the object to be measured O by a predetermined distance in response to the operation of the measurement start switch 60. After that, the measurement object point Q is shifted to the original position of the observation object point P (that is, in the reverse direction). The moving speed accelerates to the predetermined speed and the measurement object point Q passes through the position of the observation object point P. In order words, first, the measurement position of the measurement CCD cameras 21 and 22 is set to be an observation position (observation depth) of the object to be measured O. In response to the measurement start trigger, the measurement position is shifted by the distance d from the observation position. Then, the measurement position is shifted to an original observation position. After the moving speed becomes the predetermined speed, the measurement position passes through the original observation position, that is, the observation position. Therefore, according to the optical image measuring apparatus 1' in this embodiment, the image measurement can be speedily started after the input of the measurement start trigger. Thus, it is possible to preferably obtain the image at the position of the observation object point P (image of a region observed at the time of determination of the measurement region).

According to this embodiment, the measurement object point Q and the observation object point P are at the same position at the time of observation, so whether or not the interference light is normally produced can be checked. For example, in response to the operation of the measurement start switch 60, the measurement light H is generated and the interferometer moving stage 50 is moved. At this time, light guided to each of the measurement CCD cameras 21 and 22 is detected. Whether or not interference light having an adequate beat frequency is produced can be determined based on a result obtained by detection. When adequate interference light is not produced, for example, an error message can be displayed on the monitor device 30 to give an alarm to the examiner. Therefore, a measurement error can be avoided, so that unnecessary measurement is prevented.

Figure 8:
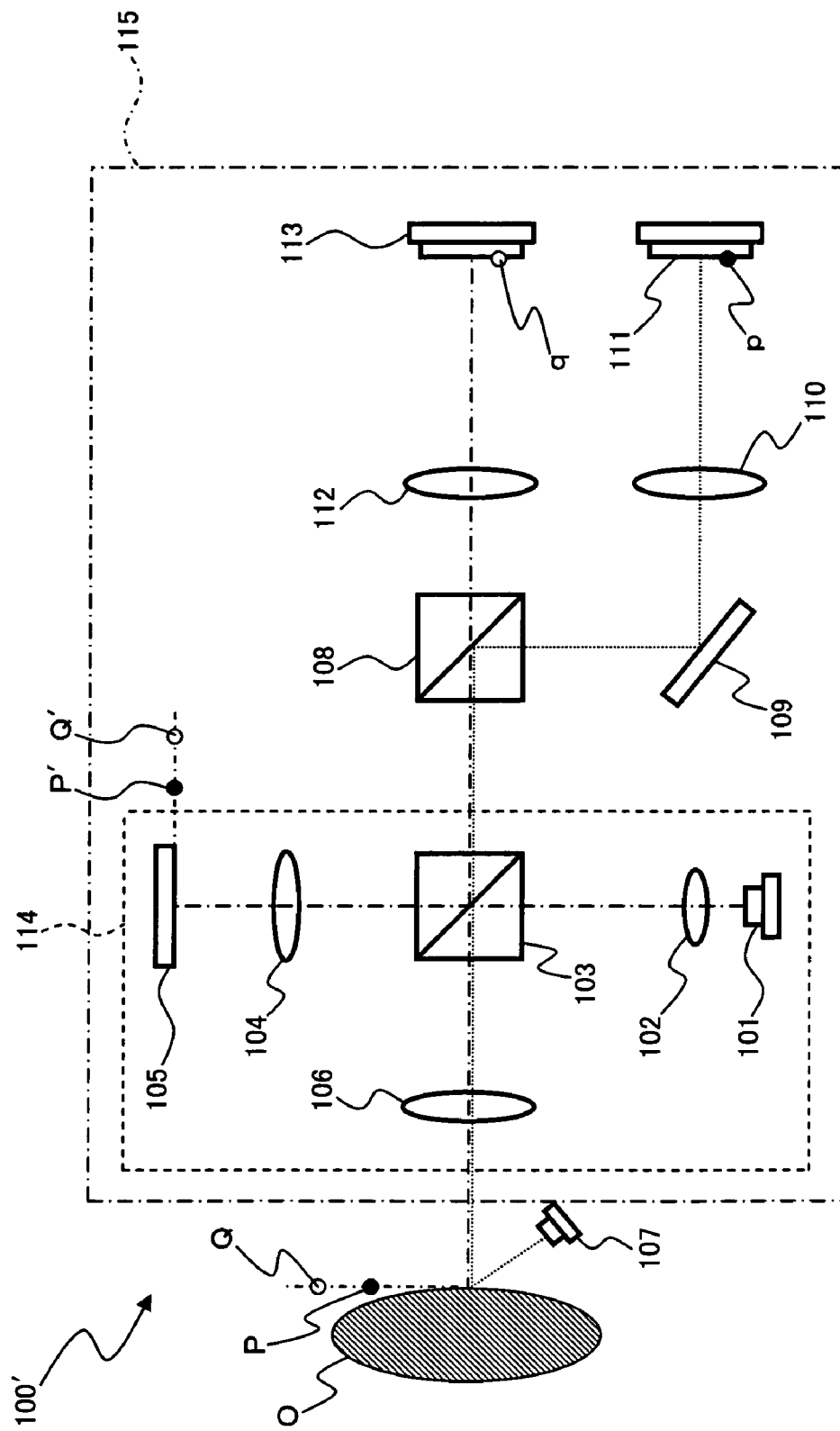
FIG. 8 is a schematic diagram showing a modified example of the configuration of the optical system of the optical image measuring apparatus according to the present invention.

An optical image measuring apparatus 100' shown in FIG. 8 is obtained by applying the structure according to this embodiment to the optical image measuring apparatus 100 described in the modified example (see FIG. 5) of the first embodiment. In the optical image measuring apparatus 100', the observation object point P of the observation CCD camera 111 is aligned with the measurement object point Q of the measurement CCD camera 113.

A processing mode of the optical image measuring apparatus 100' will be described. When the measurement start trigger is inputted by the examiner after the determination of the measurement region (corresponding to Step S24), the illumination light source 107 is turned off and the operation of the observation CCD camera 111 is stopped to end the observation operation (corresponding to Step S25).

In response to the input of the measurement start trigger, the interferometer moving stage 114 is shifted by a predetermined position from the object to be measured O (corresponding to Step S26). Then, the interferometer moving stage 114 starts to move to the position of the object to be measured O (corresponding to Step S27). Therefore, the measurement object point Q is gradually shifted to the position of the observation object point P. In addition, a moving speed of the mounted members of the interferometer moving stage 114 gradually accelerates to a predetermined speed and the mounted members are moved at constant speed after the moving speed reaches the predetermined speed (corresponding to Step S28). The moving speed of the interferometer moving stage 114 becomes the predetermined speed before the measurement object point Q reaches the observation object point P.

In response to the input of the measurement start trigger, the measurement light is outputted from the broad band light source 2, a measurement image is formed based on the detection signal from the measurement CCD camera 113, and the formed measurement image is displayed on the monitor device 30 (corresponding to Step S29).

When the measurement object point Q passes through the position of the observation object point P (corresponding to Step S30), the signal processing unit forms an image at the position of the observation object point P based on the detection signal from the measurement CCD camera 113 and causes the monitor device 30 to display the formed image (corresponding to Steps S31 and S32).

The signal processing unit periodically forms images based on scanning of the measurement object point Q in the image measurement depth direction and causes the monitor device 30 to successively display the formed images (corresponding to Steps S33 and S34). After the scanning of the measurement object point Q is completed, the image measurement is ended (corresponding to Step S35).

As in the above-mentioned embodiment, according to the optical image measuring apparatus 100', the image measurement can be speedily started after the input of the measurement start trigger. Thus, it is possible to preferably obtain the image at the position of the observation object point P (image of a region observed at the time of determination of the measurement region).

Third Embodiment

Figure 9:
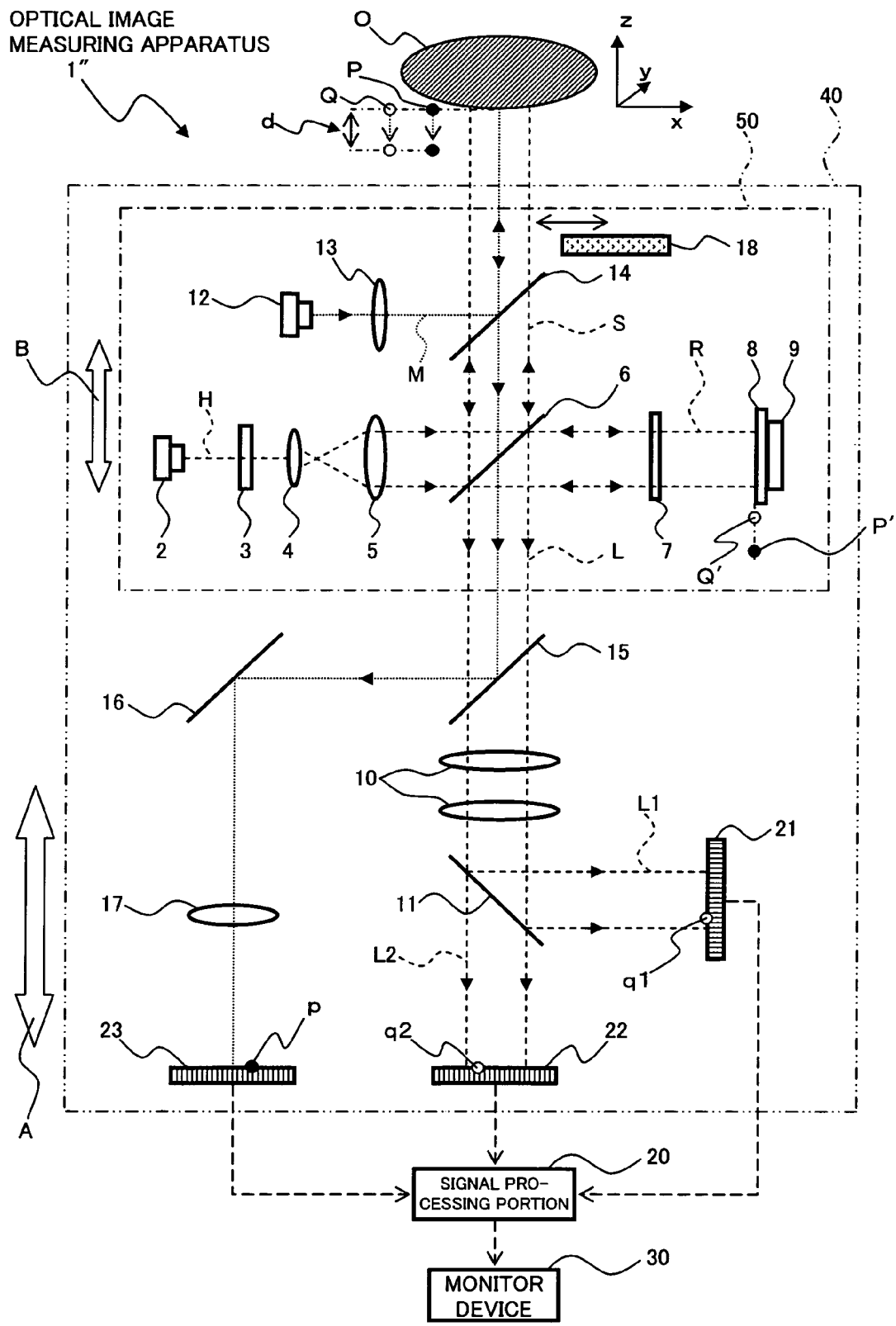
FIG. 9 is a schematic diagram showing an example of a configuration of an optical system of an optical image measuring apparatus according to a third embodiment of the present invention.
Figure 10:
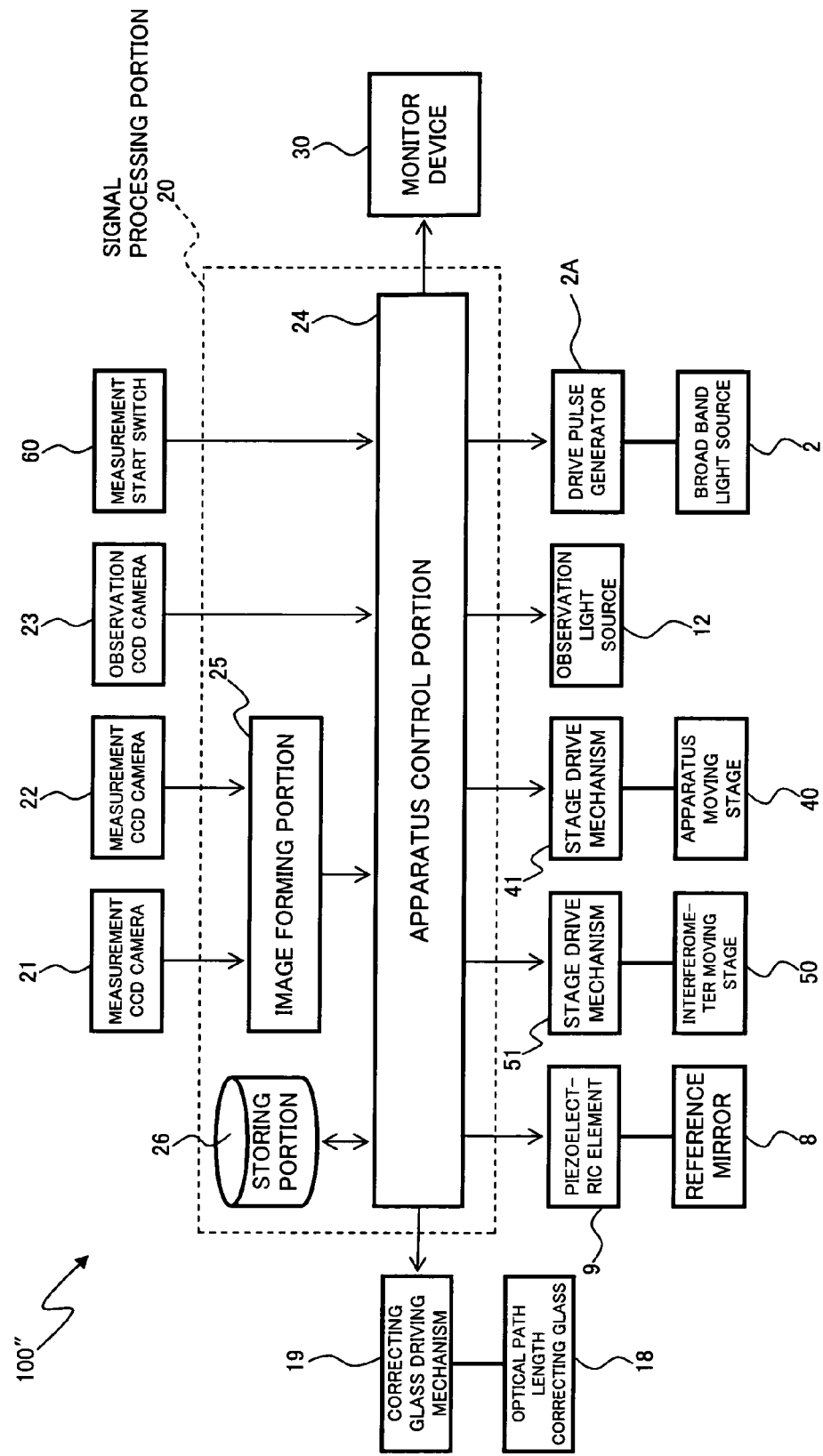
FIG. 10 is a block diagram showing an example of a configuration of a control system of the optical image measuring apparatus according to the third embodiment of the present invention.

An optical image measuring apparatus according to a third embodiment of the present invention will be described. FIG. 9 illustrates an example of an optical system of an optical image measuring apparatus 1" according to this embodiment. FIG. 10 illustrates an example of a control system of the optical image measuring apparatus 1".

The optical image measuring apparatus 1" according to this embodiment has substantially the same optical structure as that of the optical image measuring apparatus 1' according to the second embodiment (this will be described using the same reference symbols as those shown in FIG. 6). A point different from the optical system in the second embodiment is to provide an optical path length correcting glass 18 in the optical image measuring apparatus 1" (see FIG. 10).

The control system has substantially the same structure as that in each of the first and second embodiments (this will be described using the same reference symbols as those shown in FIG. 2). A different point is to provide a correction glass driving mechanism 19 for inserting and removing the optical path length correcting glass 18 to and from the optical path of the signal light S (see FIG. 10). The correction glass driving mechanism 19 is composed of, for example, a linear actuator.

When the optical path length correcting glass 18 is inserted to the optical path of the signal light S, the optical path length thereof changes, so that the measurement object point Q of each of the measurement CCD cameras 21 and 22 and the observation object point P of the observation CCD camera 23 are shifted to the apparatus side by the distance d. As in the first embodiment, the distance d is set to a distance equal to or longer than a distance necessary to move the interferometer moving stage 50 which is at a standstill and accelerate the moving speed thereof to the predetermined speed.

Figure 11:
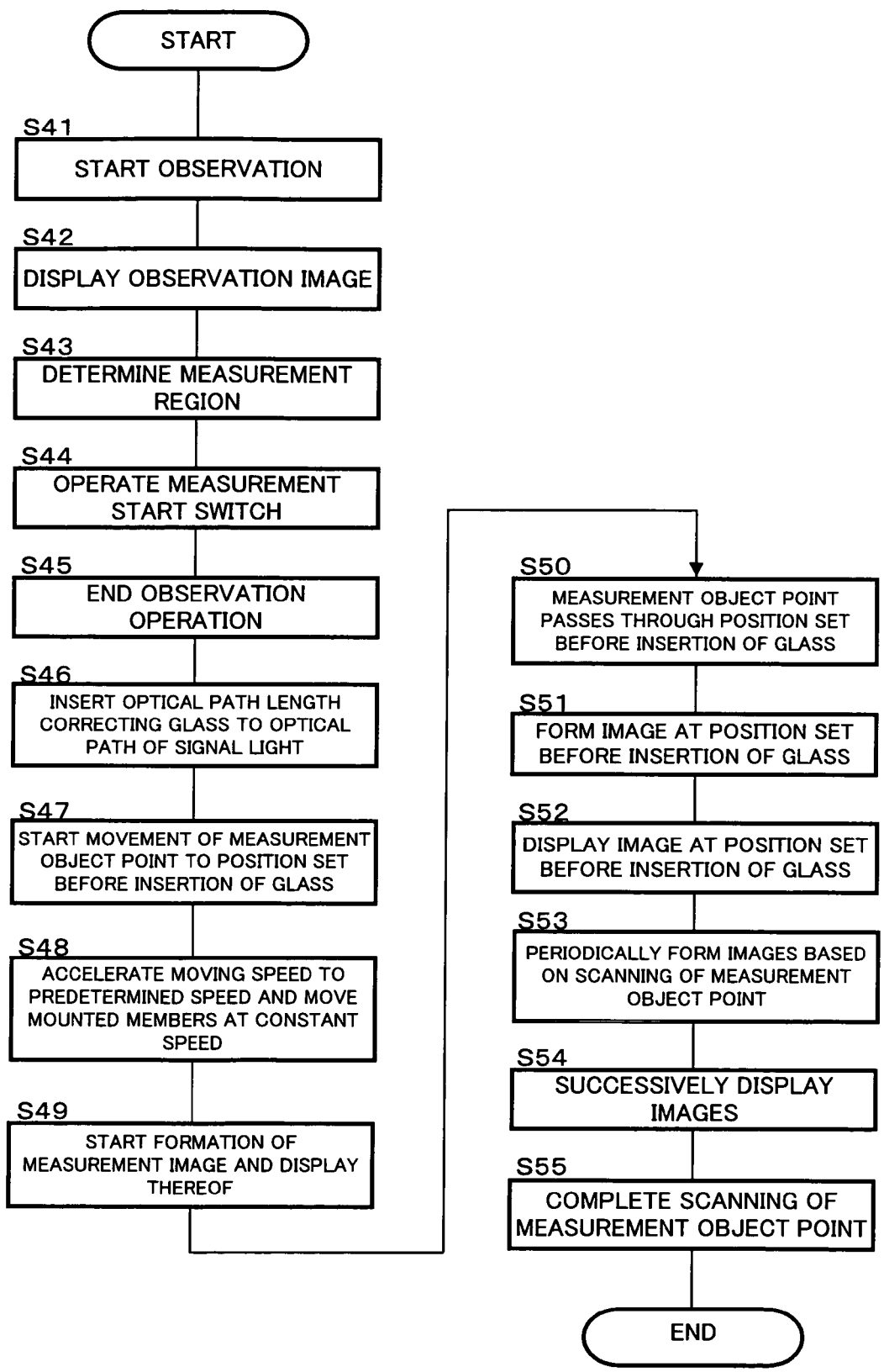
FIG. 11 is a flow chart of an example of a processing mode executed by the optical image measuring apparatus according to the third embodiment of the present invention.

An example of a processing mode executed by the optical image measuring apparatus 1" according to this embodiment as described above will be described with reference to a flow chart shown in FIG. 11. In an initial state, the optical path length correcting glass 18 is removed from the optical path of the signal light S.

When the observation start switch is operated by the examiner (Step S41), the apparatus control portion 24 turns on the observation light source 12 and causes the monitor device 30 to display the observation image based on the detection signal from the observation CCD camera 23 (Step S42). While the examiner views the displayed observation image, the examiner performs observation on focused various regions of the object to be measured O to determine the measurement region (Step S43).

At this time, the observation object point of the observation CCD camera 23 is located on, for example, the apparatus side surface (observation object point P) of the object to be measured O as shown in FIG. 9. Therefore, the observation image in which the focus is achieved on the apparatus side surface of the object to be measured O is displayed on the monitor device 30. The position of the measurement object point Q of each of the measurement CCD cameras 21 and 22 is aligned with the observation object point P.

After the determination of the measurement region, the examiner operates the measurement start switch 60 (Step S44). In response to a measurement start request, the apparatus control portion 24 turns off the observation light source 12 and stops the operation of the observation CCD camera 23 to end the observation operation (Step S45).

In response to the operation of the measurement start switch 60 (Step S44), the apparatus control portion 24 controls the correction glass driving mechanism 19 to insert the optical path length correcting glass 18 to the optical path of the signal light S (Step S46). Therefore, as shown in FIG. 9, the measurement object point Q and the observation object point P are shifted to the apparatus side by the distance d.

In response to the operation of the measurement start switch 60 (Step S44), the apparatus control portion 24 controls the stage driving mechanism 51 to move the interferometer moving stage 50 (Step S47). Thereby, the measurement object point Q of each of the measurement CCD cameras 21 and 22 is gradually shifted to the position of the measurement object point Q set before the insertion of the optical path length correcting glass 18. In addition, the apparatus control portion 24 gradually accelerates the moving speed of the mounted members of the interferometer moving stage 50 to a predetermined speed and holds the moving speed which reaches the predetermined speed to move the mounted members at constant speed (Step S48). The moving speed of the interferometer moving stage 50 becomes constant before it moves the distance d.

In response to the operation of the measurement start switch 60 (Step S44), the apparatus control portion 24 controls the drive pulse generator 2A to output the measurement light H from the broad band light source 2, controls the piezoelectric element 9 to vibrate the reference mirror 8, controls the image forming portion 25 to form a measurement image based on the detection signals from the measurement CCD cameras 21 and 22, and causes the monitor device 30 to display the measurement image (Step S49). A high-quality measurement image is not obtained until the moving speed of the interferometer moving stage 50 becomes constant.

When the measurement object point Q passes through the position set before the insertion of the optical path length correcting glass 18 (Step S50), the image forming portion 25 forms an image at the position set before the insertion of the optical path length correcting glass 18 based on the detection signals from the measurement CCD cameras 21 and 22 and transmits the image to the apparatus control portion 24 (Step S51). At this time, the moving speed of the interferometer moving stage 50 is constant, so the image at the position set before the insertion of the optical path length correcting glass 18 is preferably formed. The apparatus control portion 24 causes the monitor device 30 to display the formed image (Step S52).

The image forming portion 25 periodically forms images based on the movement of the measurement object point Q in the z-direction (scanning in image measurement depth direction) (Step S53). The periodically formed images are successively displayed on the monitor device 30 (Step S54). After the scanning of the measurement object point Q is completed (Step S55), the image measurement is ended. The measured images can be stored in the storing portion 26 or the like by the examiner if necessary.

According to the optical image measuring apparatus 1" in this embodiment, the measurement object point Q of each of the measurement CCD cameras 21 and 22 and the observation object point P are at the same position at the time of observation of the object to be measured O. The measurement object point Q is shifted from the object to be measured O by the distance d by the optical path length correcting glass 18 inserted in response to the operation of the measurement start switch 60. After that, the measurement object point Q is shifted to the position set before the insertion of the optical path length correcting glass 18. The moving speed accelerates to the predetermined speed and the measurement object point Q passes through the position set before the insertion of the optical path length correcting glass 18. Note that the position of the measurement object point Q set before the insertion of the optical path length correcting glass 18 is aligned with the observation object point P. In other words, first, the focus of each of the measurement CCD cameras 21 and 22 is achieved so as to measure the object to be measured O at an observation position (observation depth). In response to the measurement start trigger, the optical path length correcting glass 18 is inserted to the optical path to shift the measurement position by the distance d. Then, the measurement position is shifted to an original position (observation position). After the moving speed becomes the predetermined speed, the measurement position passes through the original position, that is, the observation position. Therefore, according to the optical image measuring apparatus 1" in this embodiment, the image measurement can be speedily started after the input of the measurement start trigger. Thus, it is possible to preferably obtain the image at the position of the observation object point P (image of a region observed at the time of determination of the measurement region).

Figure 12:
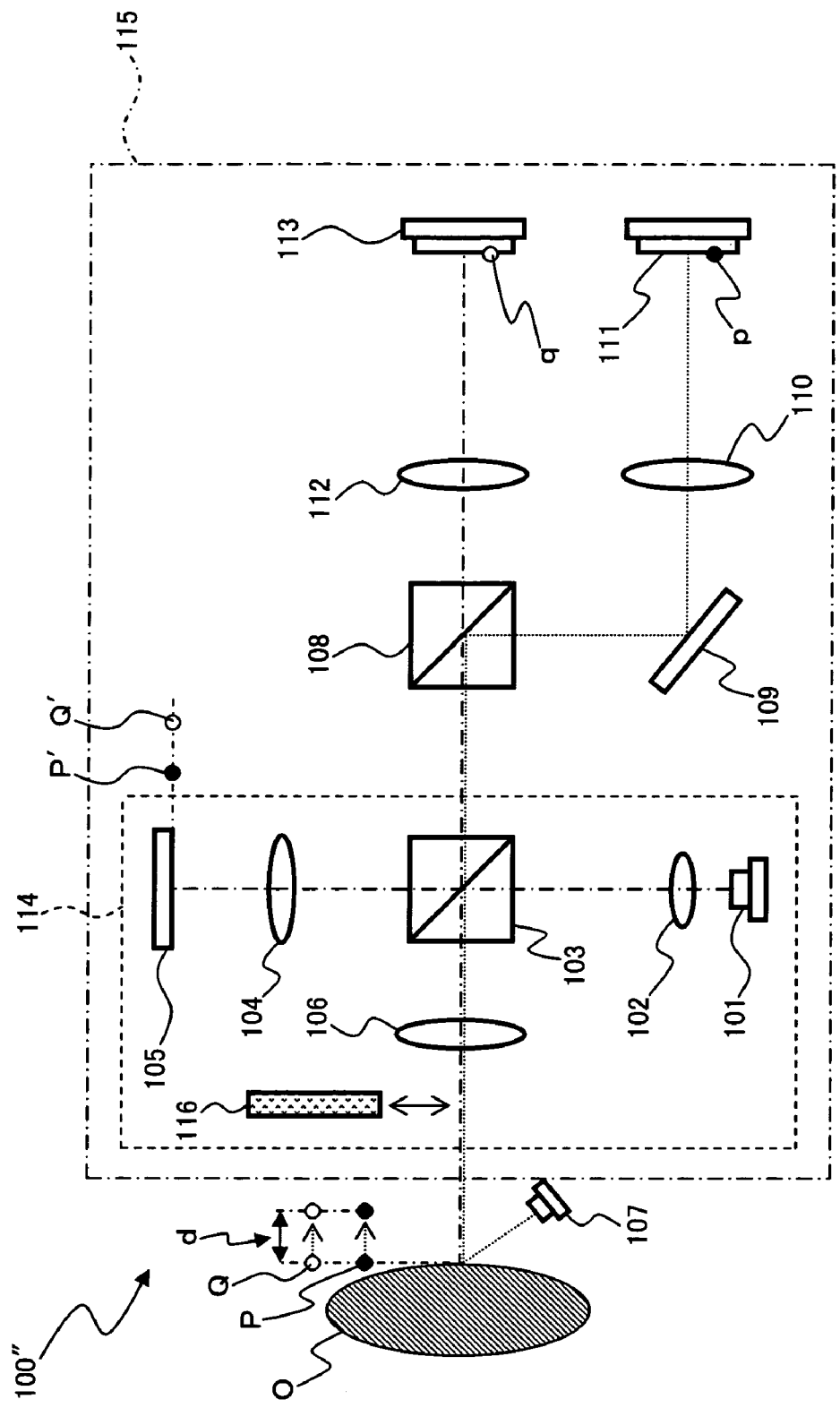
FIG. 12 is a schematic diagram showing a modified example of the configuration of the optical system of the optical image measuring apparatus according to the present invention.
Figure 13:
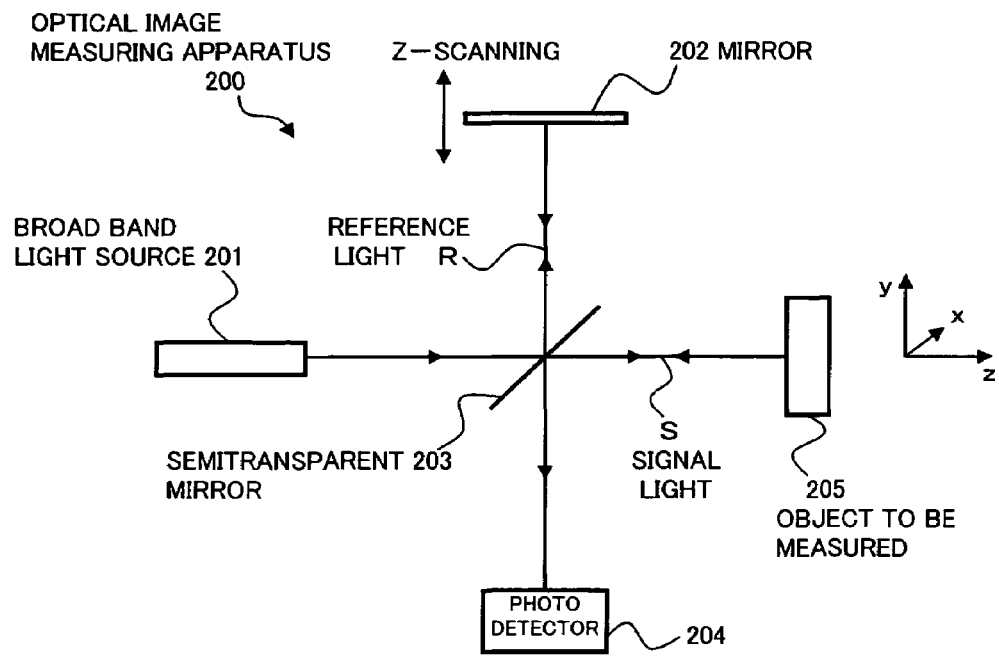
FIG. 13 is a schematic diagram showing a conventional optical image measuring apparatus.
Figure 14:
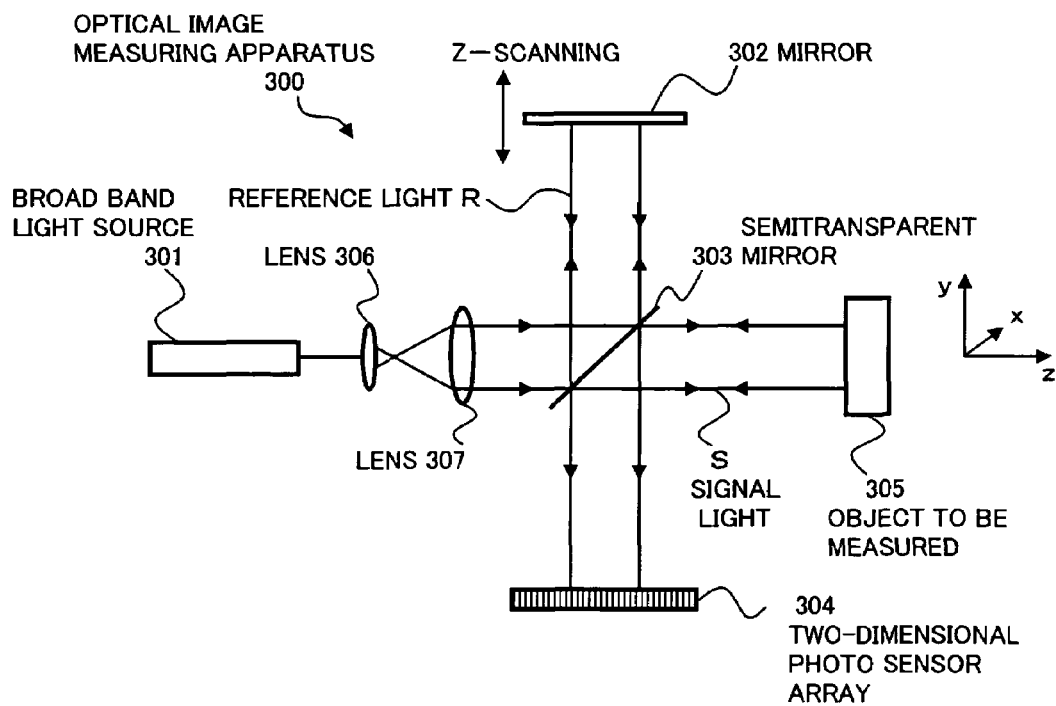
FIG. 14 is a schematic diagram showing a conventional optical image measuring apparatus.

An optical image measuring apparatus 100" shown in FIG. 12 is obtained by applying the structure according to this embodiment to the optical image measuring apparatus 100 described in the modified example (see FIG. 5) of the first embodiment. In the optical image measuring apparatus 100", the observation object point P of the observation CCD camera 111 is aligned with the measurement object point Q of the measurement CCD camera 113.

A processing mode of the optical image measuring apparatus 100" will be described. When the measurement start trigger is inputted by the examiner after the determination of the measurement region (corresponding to Step S44), the illumination light source 107 is turned off and the operation of the observation CCD camera 111 is stopped to end the observation operation (corresponding to Step S45).

In response to the input of the measurement start trigger, an optical path length correcting glass 116 is inserted to the optical path of the signal light (corresponding to Step S46). Thereby, the measurement object point Q is shifted to the apparatus side by the distance d. Then, the interferometer moving stage 114 starts to move to the position of the measurement object position Q set before the insertion of the optical path length correcting glass 116 (corresponding to Step S47). Therefore, the measurement object point Q is gradually shifted to the position of the observation object point P set before the insertion of the optical path length correcting glass 116. In addition, a moving speed of the mounted members of the interferometer moving stage 114 gradually accelerates to a predetermined speed and the mounted members are moved at constant speed after the moving speed reaches the predetermined speed (corresponding to Step S48). The moving speed of the interferometer moving stage 114 becomes the predetermined speed before the measurement object point Q reaches the position of the observation object point P set when the optical path length correcting glass 116 is not inserted.

In response to the input of the measurement start trigger, the measurement light is outputted from the broad band light source 2, a measurement image is formed based on the detection signal from the measurement CCD camera 113, and the formed measurement image is displayed on the monitor device 30 (corresponding to Step S49).

When the measurement object point Q passes through the position of the observation object point P set before the insertion of the optical path length correcting glass 116 (corresponding to Step S50), the signal processing unit forms an image at the position of the observation object point P set before the insertion of the optical path length correcting glass 116 based on the detection signal from the measurement CCD camera 113 and causes the monitor device 30 to display the formed image (corresponding to Steps S51 and S52).

The signal processing unit periodically forms images based on scanning of the measurement object point Q in the image measurement depth direction and causes the monitor device 30 to successively display the formed images (corresponding to Steps S53 and S54). After the scanning of the measurement object point Q is completed, the image measurement is ended (corresponding to Step S55).

As in the above-mentioned embodiment, according to the optical image measuring apparatus 100″, the image measurement can speedily start after the input of the measurement start trigger. Thus, it is possible to preferably obtain the image at the position of the observation object point P which is the same position as the measurement object point Q set before the insertion of the optical path length correcting glass (image of a region observed at the time of determination of the measurement region).

The above-mentioned detailed structures are merely examples for implementing the present invention. Thus, various modifications can be made without departing from the spirit of the present invention.

What is claimed is:

1. An optical image measuring apparatus for forming an image of the object to be measured based on a received interference signal, comprising:
   an illumination optical system for illuminating an object to be measured with observation light;
   observation light receiving means for receiving reflection light of the observation light on the object to be measured to generate a signal;
   observation light focusing means for focusing the reflection light of the observation light on the observation light receiving means;
   display means for displaying an observation image of the object to be measured based on a signal generated by the observation light focusing means;
   operating means operated to start image measurement based on the observation image;
   a measurement light source for generating measurement light when the operating means is operated;
   dividing means for dividing the generated measurement light into signal light propagating through the object to be measured and reference light propagating through a reference object;
   superimposing means for superimposing the signal light propagating through the object to be measured and the reference light propagating through the reference object on each other to produce interference light;
   measurement light receiving means for receiving the produced interference light to generate a signal, provided to locate a measurement object point in a position shifted from a position of the observation object point in the optical path direction of the signal light by a predetermined distance when the reflection light of the observation light is focused on the observation light receiving means; and
   optical path length adjusting means for adjusting an optical path length difference between the signal light and the reference light to shift the measurement object point of the measurement light receiving means to a position of the observation object point shifted by the predetermined distance when the operating means is operated,
   wherein the observation object point is a focus point where the reflective light of the observation light is focused on the observation light receiving means, and
   wherein the measurement object point is a point that forms an image point of the interference light on the measurement light receiving means.

2. An optical image measuring apparatus according to claim 1, wherein the optical path length adjusting means comprises moving means for integrally moving the measurement light source, the reference object, the dividing means, and the superimposing means in the optical path direction of the signal light.

3. An optical image measuring apparatus according to claim 2, wherein:
   the moving means starts to integrally move the measurement light source, the reference object, the dividing means, and the superimposing means when the operating means is operated; and
   the predetermined distance is set to a distance equal to or longer than a distance necessary to integrally move the measurement light source, the reference object, the dividing means, the frequency shifting means, and the superimposing means by the moving means, each of which is at a standstill and accelerate a moving speed of the moving means to a predetermined speed.

4. An optical image measuring apparatus according to claim 3, wherein the illumination optical system comprises an observation light source for generating the observation light to the object to be measured in an oblique direction relative to an optical path of the signal light.

5. An optical image measuring apparatus according to claim 4, wherein:
   the reflection light of the observation light on the object to be measured is guided along an optical path of the signal light propagating through the object to be measured and then guided along an optical path of the interference light through the superimposing means;
   the optical image measuring apparatus further comprises separating means for separating an optical path of the reflection light of the observation light from an optical path of the interference light; and
   the observation light focusing means focuses the reflection light of the observation light propagating on the separated optical path on the observation light receiving means.

6. An optical image measuring apparatus according to claim 5, wherein the observation light focusing means comprises focal point shifting means for integrally moving the observation light receiving means, the observation light focusing means, the measurement light source, the reference object, the dividing means, the superimposing means, and the measurement light receiving means in an optical path direction of the signal light.

7. An optical image measuring apparatus according to claim 3, wherein the illumination optical system comprises an observation light source for generating the observation light and joining means for joining an optical path of the generated observation light to an optical path of the signal light.

8. An optical image measuring apparatus according to claim 1, wherein the optical path length adjusting means comprises reference object moving means for moving the reference object in an optical path direction of the reference light.

9. An optical image measuring apparatus according to claim 8, wherein:

the reference object moving means starts to move the reference object when the operating means is operated; and the predetermined distance is set to a distance equal to or longer than a distance necessary to move the reference object which is at a standstill by the reference object moving means and accelerate a moving speed of the reference object to a predetermined speed.

10. An optical image measuring apparatus according to claim 9, wherein the illumination optical system comprises an observation light source for generating the observation light to the object to be measured in an oblique direction relative to an optical path of the signal light.

11. An optical image measuring apparatus according to claim 10, wherein:

the reflection light of the observation light on the object to be measured is guided along an optical path of the signal light propagating through the object to be measured and then guided along an optical path of the interference light through the superimposing means;

the optical image measuring apparatus further comprises separating means for separating an optical path of the reflection light of the observation light from an optical path of the interference light; and the observation light focusing means focuses the reflection light of the observation light propagating on the separated optical path on the observation light receiving means.

12. An optical image measuring apparatus according to claim 11, wherein the observation light focusing means comprises focal point shifting means for integrally moving the observation light receiving means, the observation light focusing means, the measurement light source, the reference object, the dividing means, the superimposing means, and the measurement light receiving means in an optical path direction of the signal light.

13. An optical image measuring apparatus according to claim 9, wherein the illumination optical system comprises an observation light source for generating the observation light and joining means for joining an optical path of the generated observation light to an optical path of the signal light.

* * * * *